US009166727B2

(12) United States Patent
Yamashita

(10) Patent No.: US 9,166,727 B2
(45) Date of Patent: Oct. 20, 2015

(54) OPTICAL COMMUNICATION SYSTEM, OPTICAL NETWORK MANAGEMENT APPARATUS AND OPTICAL NETWORK MANAGEMENT METHOD

(75) Inventor: Shinji Yamashita, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 1063 days.

(21) Appl. No.: 13/137,985

(22) Filed: Sep. 22, 2011

(65) Prior Publication Data
US 2012/0076496 A1 Mar. 29, 2012

(30) Foreign Application Priority Data
Sep. 29, 2010 (JP) ................................ 2010-219383

(51) Int. Cl.
H04J 14/00 (2006.01)
H04J 14/02 (2006.01)

(52) U.S. Cl.
CPC ......... H04J 14/0284 (2013.01); *H04J 14/0212* (2013.01)

(58) Field of Classification Search
CPC .............. H04J 14/0212; H04J 14/0269; H04J 14/0238; H04J 14/0284; H04J 14/0257; H04J 14/0268; H04Q 11/0005; H04Q 2011/0052; H04Q 2201/804; H04Q 2213/13107; H04Q 2213/13242; H04Q 2213/13396; H04Q 2213/13003; H01L 2924/1461; H01L 12/18; G02B 26/08; B81B 3/0051; B81B 2201/042; G02F 1/0128; G02F 1/29; H04B 3/00
USPC ............................... 398/45, 48–50, 56–58, 68
See application file for complete search history.

(56) References Cited

U.S. PATENT DOCUMENTS

| 7,330,617 | B2 * | 2/2008 | Aota et al. ...................... 385/18 |
| 7,339,897 | B2 * | 3/2008 | Larsson et al. ................ 370/252 |
| 7,558,448 | B2 * | 7/2009 | Ishii et al. ....................... 385/18 |
| 7,636,503 | B2 * | 12/2009 | Yamamoto et al. .............. 385/18 |
| 7,656,829 | B2 | 2/2010 | Kim et al. |
| 7,660,526 | B2 * | 2/2010 | Casanova et al. ................. 398/7 |
| 7,689,120 | B2 * | 3/2010 | Hoang et al. ..................... 398/57 |

(Continued)

FOREIGN PATENT DOCUMENTS

| JP | 2005-198312 | * | 7/2005 | ............. H04L 12/28 |
| JP | 2008-249786 | | 10/2008 | |

(Continued)

OTHER PUBLICATIONS

Japanese Office Action mailed Feb. 4, 2014 in corresponding Japanese Application No. 2010-219383.

(Continued)

*Primary Examiner* — Hibret Woldekidan
(74) *Attorney, Agent, or Firm* — Staas & Halsey LLP

(57) ABSTRACT

An optical communication system includes a plurality of wavelength selective switches arranged on an optical network; and an optical network management apparatus configured to manage and control the optical network. In response to a path establishing request, the optical network management apparatus determines power consumption of each path that satisfies the path establishing request in the optical network based upon a wavelength being used at a connection port of each of the wavelength selective switches, selects a route based upon the determined power consumption of each of the path, and sets the selected route in the optical network.

17 Claims, 21 Drawing Sheets

(56) References Cited

U.S. PATENT DOCUMENTS

| | | | |
|---|---|---|---|
| 7,764,881 B2 * | 7/2010 | Aoki | 398/2 |
| 8,166,327 B2 * | 4/2012 | Nonaka et al. | 713/324 |
| 8,693,869 B2 * | 4/2014 | Fukashiro | 398/50 |
| 8,693,880 B2 * | 4/2014 | Sakauchi et al. | 398/140 |
| 9,054,828 B2 * | 6/2015 | He | 1/1 |
| 2002/0061157 A1 * | 5/2002 | Ducellier et al. | 385/17 |
| 2005/0232231 A1 * | 10/2005 | Miyabe | 370/351 |
| 2006/0093256 A1 * | 5/2006 | Yamashita et al. | 385/18 |
| 2008/0239444 A1 * | 10/2008 | Aota et al. | 359/223 |
| 2012/0008945 A1 * | 1/2012 | Singla et al. | 398/49 |
| 2012/0163807 A1 * | 6/2012 | Morea et al. | 398/29 |
| 2012/0237212 A1 * | 9/2012 | Nishihara et al. | 398/26 |
| 2013/0006530 A1 * | 1/2013 | Nishiuma et al. | 701/533 |
| 2014/0029944 A1 * | 1/2014 | Sato et al. | 398/50 |
| 2014/0328587 A1 * | 11/2014 | Magri et al. | 398/26 |

FOREIGN PATENT DOCUMENTS

| | | | | |
|---|---|---|---|---|
| JP | 2009-141425 | | 6/2009 | |
| JP | 2010-011096 | | 1/2010 | |
| JP | 2010-212908 | * | 9/2010 | H04L 12/56 |

OTHER PUBLICATIONS

Patent Abstracts of Japan, Publication No. 2010-212908, Published Sep. 24, 2010.

* cited by examiner

FIG.12

| CONNECTION PORT | P1 | | | | P2 | | | |
|---|---|---|---|---|---|---|---|---|
| WAVELENGTH | $\lambda 1$ | $\lambda 2$ | $\lambda 3$ | $\lambda 4$ | $\lambda 1$ | $\lambda 2$ | $\lambda 3$ | $\lambda 4$ |
| POWER COST IN CONNECTION MODE | 56 | 54 | 52 | 50 | 36 | 34 | 32 | 30 |
| POWER COST IN STANDBY MODE | 20 | 20 | 20 | 20 | 20 | 20 | 20 | 20 |

| | WAVELENGTH | WSS#1 | WSS#2 | WSS#3 | WSS#4 | WSS#5 | WSS#6 |
|---|---|---|---|---|---|---|---|
| INCLINATION ANGLE CONTROLLER | λ1 | O | O | O | O | O | O |
| | λ2 | O | O | O | O | O | O |
| | λ3 | O | O | O | O | O | O |
| | λ4 | O | O | O | O | O | O |
| DRIVING VOLTAGE AMPLIFIER | λ1 | × | × | × | × | × | × |
| | λ2 | × | × | × | × | × | × |
| | λ3 | × | × | × | × | × | × |
| | λ4 | O | × | × | O | O | O |

O:POWER ON  ×:POWER OFF

FIG.15

| WAVELENGTH | | WSS#1 | WSS#2 | WSS#3 | WSS#4 | WSS#5 | WSS#6 |
|---|---|---|---|---|---|---|---|
| INCLINATION ANGLE CONTROLLER | λ1 | ○ | × | × | ○ | ○ | ○ |
| | λ2 | ○ | × | × | ○ | ○ | ○ |
| | λ3 | ○ | × | × | ○ | ○ | ○ |
| | λ4 | ○ | × | × | ○ | ○ | ○ |
| DRIVING VOLTAGE AMPLIFIER | λ1 | × | × | × | × | × | × |
| | λ2 | × | × | × | × | × | × |
| | λ3 | × | × | × | × | × | × |
| | λ4 | ○ | × | × | ○ | ○ | ○ |

○:POWER ON   ×:POWER OFF

FIG.17

| | WAVELENGTH | WSS#1 | WSS#2 | WSS#3 | WSS#4 | WSS#5 | WSS#6 |
|---|---|---|---|---|---|---|---|
| INCLINATION ANGLE CONTROLLER | λ1 | × | × | × | × | × | × |
| | λ2 | × | × | × | × | × | × |
| | λ3 | × | × | × | × | × | × |
| | λ4 | ○ | × | × | ○ | ○ | ○ |
| DRIVING VOLTAGE AMPLIFIER | λ1 | × | × | × | × | × | × |
| | λ2 | × | × | × | × | × | × |
| | λ3 | × | × | × | × | × | × |
| | λ4 | ○ | × | × | ○ | ○ | ○ |

○:POWER ON  ×:POWER OFF

FIG.19

| | WAVELENGTH | WSS#1 | WSS#2 | WSS#3 | WSS#4 | WSS#5 | WSS#6 |
|---|---|---|---|---|---|---|---|
| INCLINATION ANGLE CONTROLLER | λ1 | × | × | × | × | × | × |
| | λ2 | × | × | × | × | × | × |
| | λ3 | × | × | × | × | × | × |
| | λ4 | ○ | ○ | ○ | ○ | ○ | ○ |
| DRIVING VOLTAGE AMPLIFIER | λ1 | × | × | × | × | × | × |
| | λ2 | × | × | × | × | × | × |
| | λ3 | × | × | × | × | × | × |
| | λ4 | ○ | × | × | ○ | ○ | ○ |

○:POWER ON   ×:POWER OFF

OPTICAL COMMUNICATION SYSTEM, OPTICAL NETWORK MANAGEMENT APPARATUS AND OPTICAL NETWORK MANAGEMENT METHOD

CROSS REFERENCE TO RELATED APPLICATIONS

This application is based upon and claims the benefit of priority of the prior Japanese Patent Application No. 2010-219383 filed on Sep. 29, 2010, the entire contents of which are incorporated herein by reference.

FIELD

The embodiments discussed herein relate to an optical communication system, an optical network management apparatus, and an optical network management method.

BACKGROUND

Due to increased volume of Internet traffic in recent years, power consumption of network equipment is increasing rapidly and intensified efforts have been made to enhance power-saving in networks. Under these circumstances, it has been found that cost-per-bit or power consumption per bit for switching traffic can be reduced by carrying out as much traffic processing in lower layers as possible. To realize this, many studies and activities have been conducted to establish an all-photonic network.

In an optical network constituting a metro core network, wavelength division multiplexing (WDM) is employed to deal with and carry a huge volume of traffic.

At these nodes handling WDM signals, wavelength selective switches (WSSs) are employed more and more as optical modules for carrying out Add/Drop or switching on a wavelength-by-wavelength basis.

A technique for reducing an amount of path computation for an optical path is proposed (see Patent Document 1). A path search technique capable of reducing processing time is also proposed (Patent Document 2). A WSS that can control degradation of pass-band characteristics is also known (Patent Document 3).

PRIOR ART DOCUMENT

Patent Document 1: Japanese Laid-Open Patent Publication No. 2010-11096
Patent Document 2: Japanese Laid-Open Patent Publication No. 2009-141425
Patent Document 3: Japanese Laid-Open Patent Publication No. 2008-249786

With conventional techniques, a cost value is managed on the assumption that the power consumption of a WSS be constant, and a path with the minimum power consumption is selected to establish an optical network.

However, since a WSS has a characteristic that the power consumption varies depending on the connection port and/or the wavelength being used, it is difficult for the conventional techniques to correctly select the optimal path with a desired level of power consumption to realize a power-saving optical network. Accordingly, efficient power-saving techniques for optical networks are demanded.

SUMMARY

According to one aspect of the present disclosure, an optical communication system is provided, which system includes multiple wavelength selective switches arranged on an optical network, and an optical network management apparatus configured to manage and control the optical network, wherein in response to a path establishing request, the optical network management apparatus determines power consumption of each of paths that satisfies the path establishing request in the optical network based upon a wavelength being used at a connection port of each of the wavelength selective switches, selects a route based upon the determined power consumption of each of the paths, and sets the selected route in the optical network.

The object and advantages of the invention will be realized and attained by means of the elements and combinations particularly pointed out in the claims.

It is to be understood that both the foregoing general description and the following detailed description are exemplary and explanatory and are not restrictive to the invention as claimed.

BRIEF DESCRIPTION OF DRAWINGS

FIG. 12 illustrates an example of a power cost value table;
FIG. 13 illustrates operating statuses of the inclination angle controllers and the driving voltage amplifiers;
FIG. 15 illustrates operating statuses of the inclination angle controllers and the driving voltage amplifiers;
FIG. 17 illustrates operating statuses of the inclination angle controllers and the driving voltage amplifiers;
FIG. 19 illustrates operating statuses of the inclination angle controllers and the driving voltage amplifiers.

DESCRIPTION OF EMBODIMENTS

Figure 1:
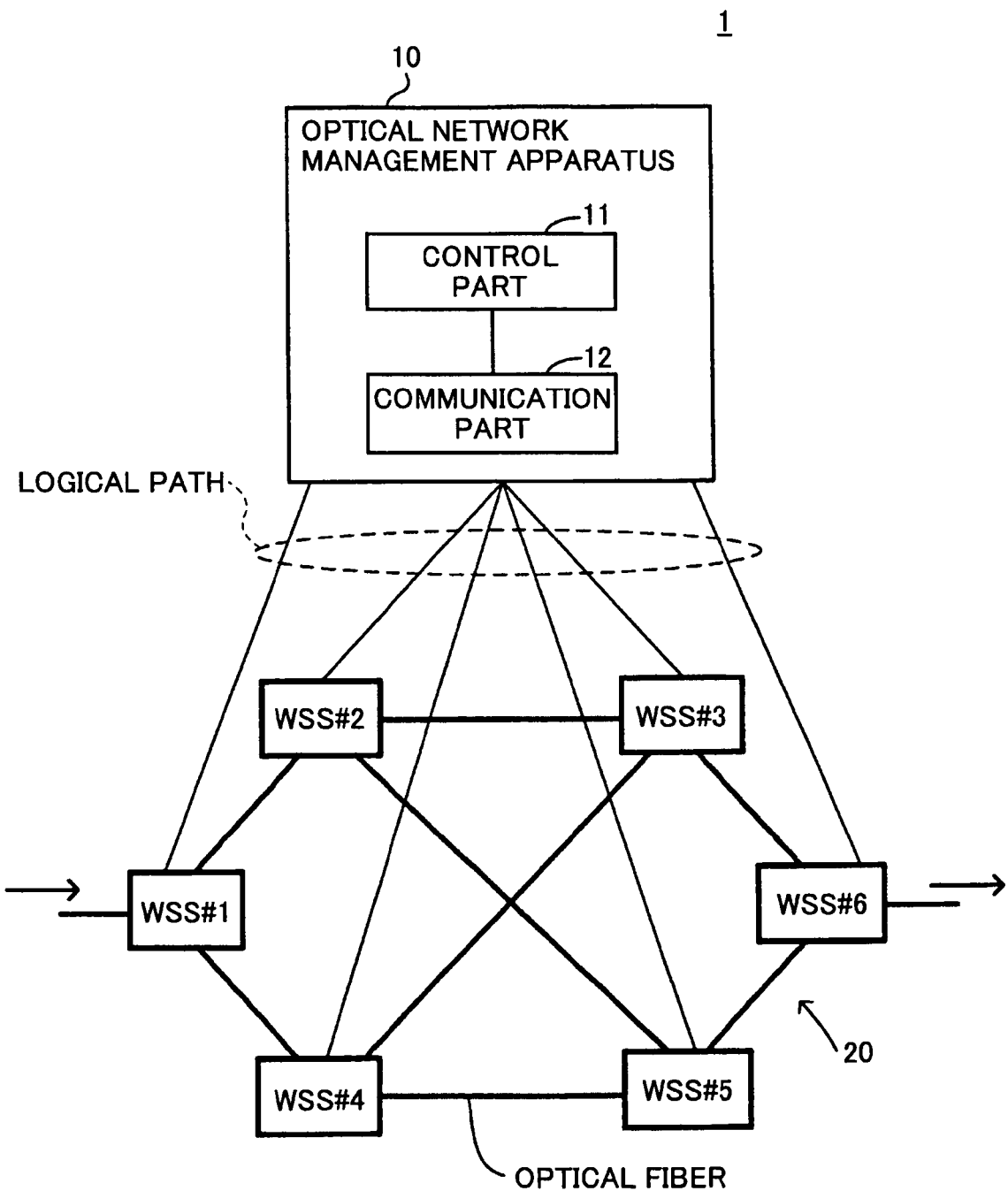
FIG. 1 is a schematic diagram illustrating an optical communication system.

The embodiments are now described with reference to accompanying drawings. FIG. 1 illustrates a structural example of an optical communication system 1. The optical communication system 1 includes multiple wavelength selective switches (hereinafter abbreviated to WSSs) #1-#6 arranged in an optical network 20, and an optical network management apparatus 10 that carries out management control for the optical network 20.

The optical network management apparatus 10 is connected to the WSSs #1-#6 via logical paths. Each of the WSSs #1-#6 is connected to specific other of the WSSs via optical fibers. The optical network management apparatus 10 has a control part 11 and a communication part 12. For example, a processor serves as the control part 11, and a communication interface serves as the communication part 11.

The control part (or the processor) 11 carries out management control on the optical network 20 in which WSSs #1-#6 are arranged. The communication part 12 serves as a communication interface with the WSSs #1-#6. The control part 11 also performs power-saving control by controlling power consumption of the Wsss #1-#6 according to the connection ports and the currently used wavelengths of the WSSs #1-#6 to establish an optical network at constant power consumption.

In response to a path establishing request, the control part 10 calculates power consumption for each path that satisfies the path establishing request in the optical network 20, based upon a connection port and a wavelength to be used at that connection port of each of the WSSs #1-#6. The control part 10 selects a route based upon the calculated power consumption per path, and sets the selected route in the optical network 20.

Figure 2:
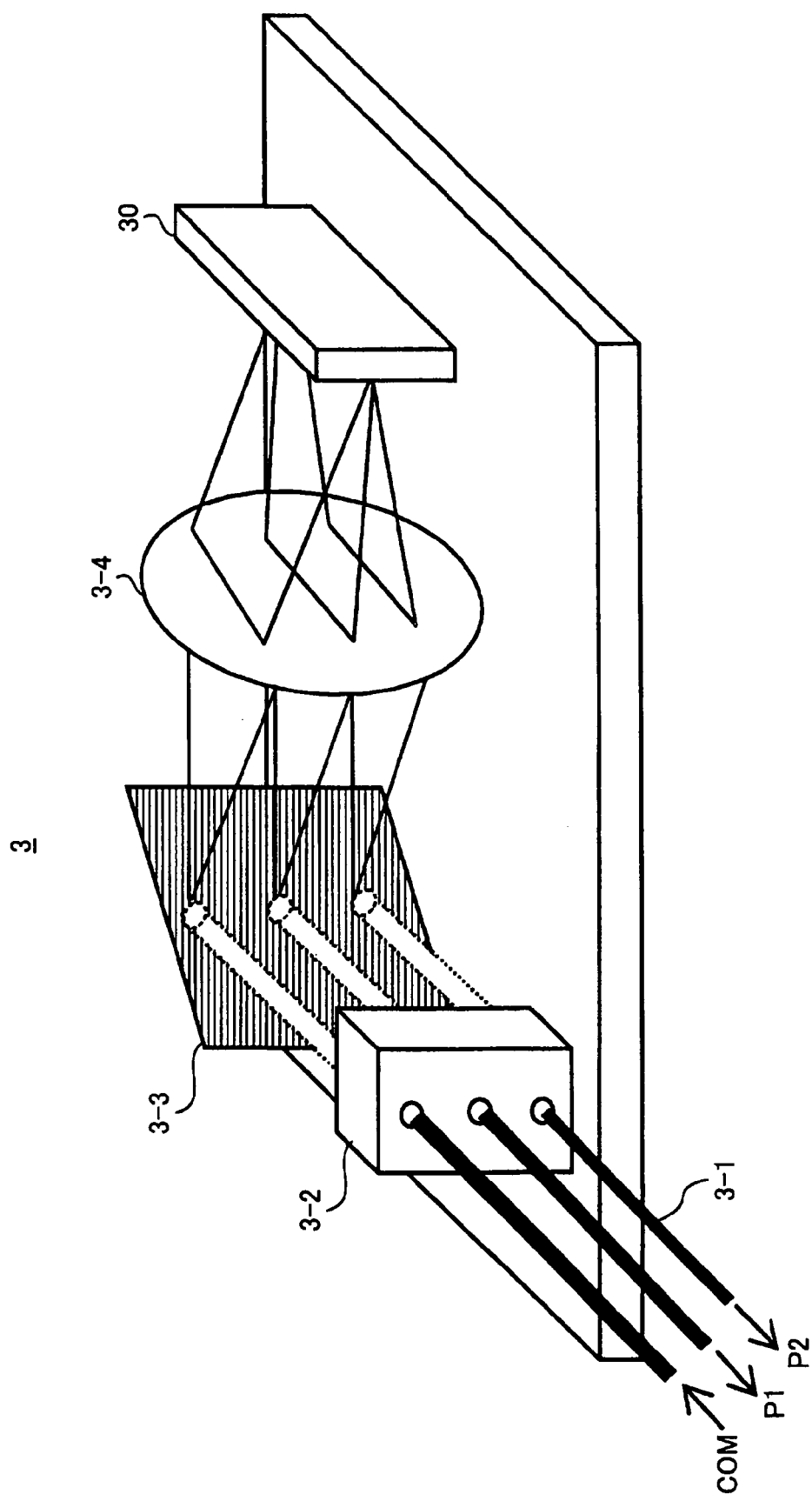
FIG. 2 is a schematic diagram illustrating an exemplary structure of a WSS.

Next, explanation is made of a structure and a characteristic of a WSS. FIG. 2 illustrates a structure of a WSS 3. The WSS 3 includes an optical fiber array 3-1, a fiber collimator array 3-2, a diffraction grating 3-3, a lens 3-4, and a MEMS (micro electro mechanical systems) mirror array 30. The optical fiber array 3-1 has a port COM, a port P1 and a port P2. In this example, the port COM is used as an input port, while the ports P1 and P2 are used as output ports.

WDM light in which multiple wavelengths are multiplexed is input to the WSS 3 via the port COM of the optical fiber array 3-1, and converted into parallel beams by the fiber collimator array 3-2. The collimated beam is incident on the diffraction grating 3-3, which then outputs multiple wavelength components at different angles of dispersion corresponding to the multiplexed wavelengths.

The lens 3-4 focuses the dispersed light components output from the diffraction grating 3-3 onto the associated mirrors of the MEMS mirror array 30, each mirror corresponding to one of the multiplexed wavelengths. The MEMS mirror array 30 reflects the incident light components back to the lens 3-4, the diffraction grating 3-3, the fiber collimator array 3-2 and the port P1 or P2 along the reverse path by changing the inclination of the mirrors.

The diffraction grating 3-3 is an optical device with a number of parallel grooves engraved periodically on a glass substrate. The diffraction grating 3-3 separates the light incident at prescribed angles on the grating into the respective wavelength components by giving different output angles to the corresponding wavelength components, making use of the light diffraction phenomenon.

The MEMS mirror array 30 has multiple mirrors. Each of the mirrors corresponds to one of the wavelength components separated by the diffraction grating 3-3. Each mirror has a variable inclination angle. The output port of the corresponding wavelength component is determined by the inclination angle of the associated mirror.

Figure 3:
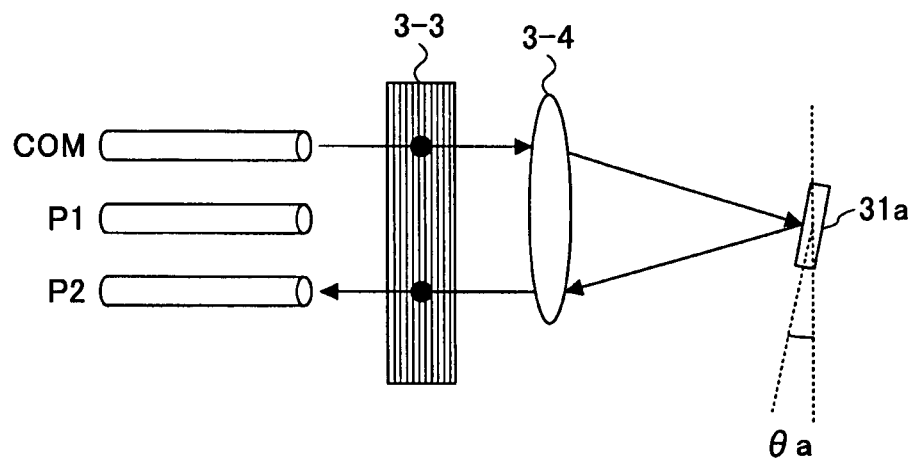
FIG. 3 illustrates switching of output ports in accordance with the inclination angle of the MEMS mirror.
Figure 4:
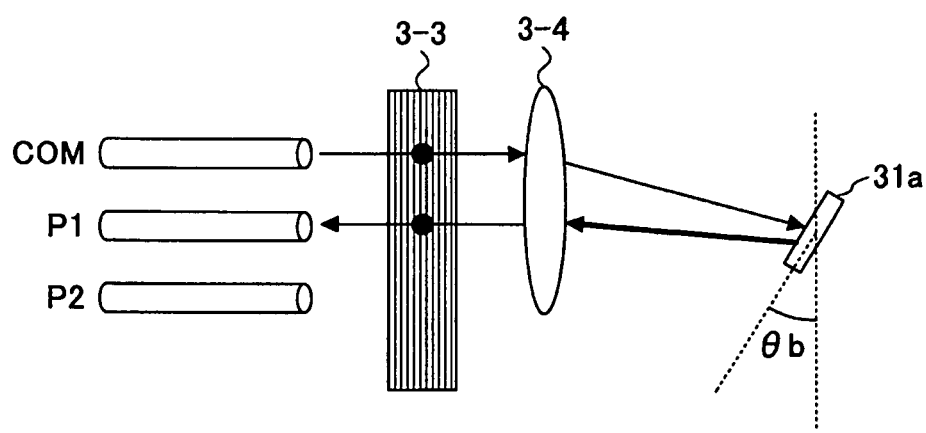
FIG. 4 illustrates switching of output ports in accordance with the inclination angle of the MEMS mirror.

FIG. 3 and FIG. 4 illustrate output port switching operations in accordance with the inclination angles of the MEMS mirrors. In these figures, the fiber collimator array 3-2 is omitted. In this example, the output port P1 is placed below the input port COM, and the output port P2 is placed below the output port P1.

With this output port arrangement, when the inclination angle of the MEMS mirror 31a is $\theta a$ as illustrated in FIG. 3, the light component reflected at the MEMS mirror 31a passes through the lens 3-4 and the diffraction grating 3-3 and is output from the port P2.

In FIG. 4, the inclination angle of the MEMS mirror 31a is set to $\theta b$ which is greater than $\theta a$. In this case, the light component reflected at the MEMS mirror 31a passes through the lens 3-4 and the diffraction grating 3-3 and is output from the port P1.

Figure 5:
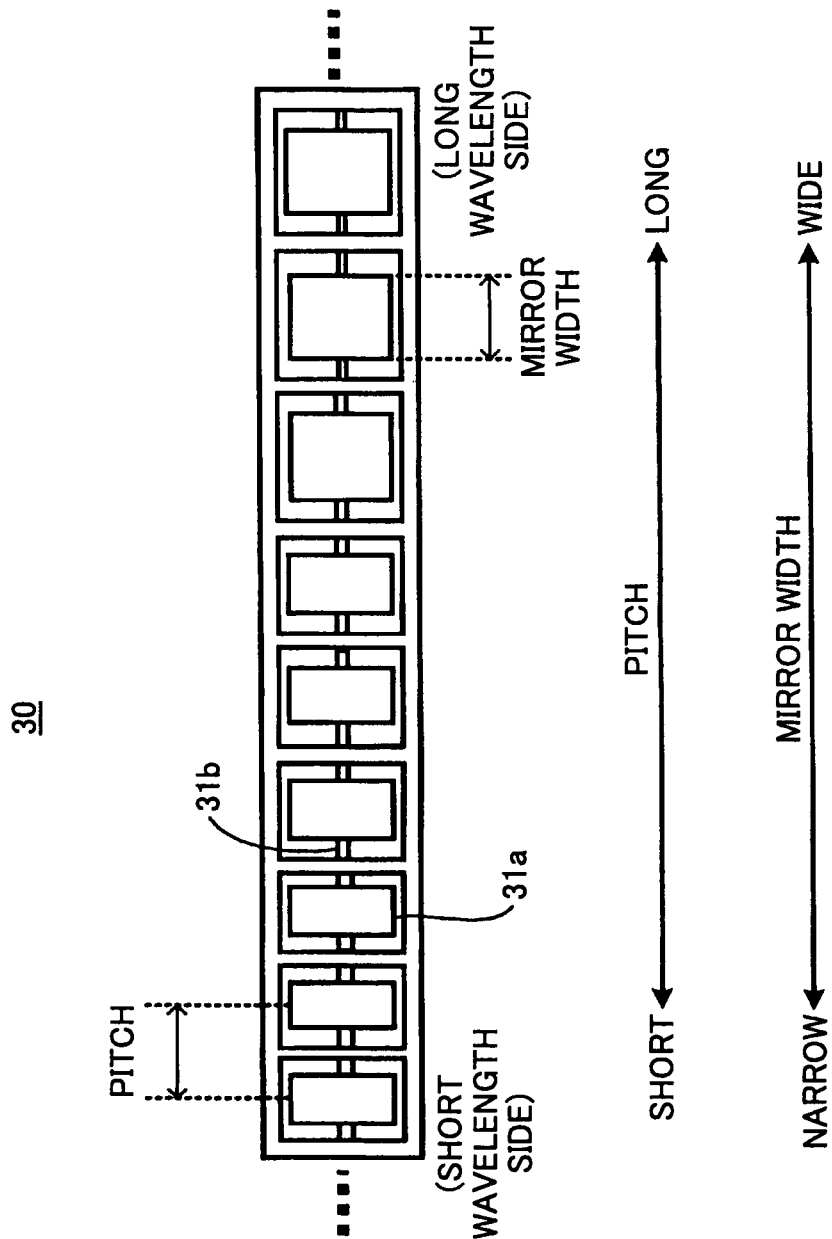
FIG. 5 illustrates an example of an array of MEMS mirrors.

FIG. 5 illustrates an example of mirror arrangement of the MEMS mirror array 30. The MEMS mirror array 30 includes multiple MEMS mirrors 31a and torsion bars 31b formed of an elastic material to retain the associated MEMS mirror 31a.

In the MEMS mirror array 30, the pitch becomes longer from the short wavelength side toward the long wavelength side due to the nonlinearity of the angle of dispersion of the diffraction grating 3-3. Along with the increase of pitch, the width of the mirror becomes greater.

Figure 6:
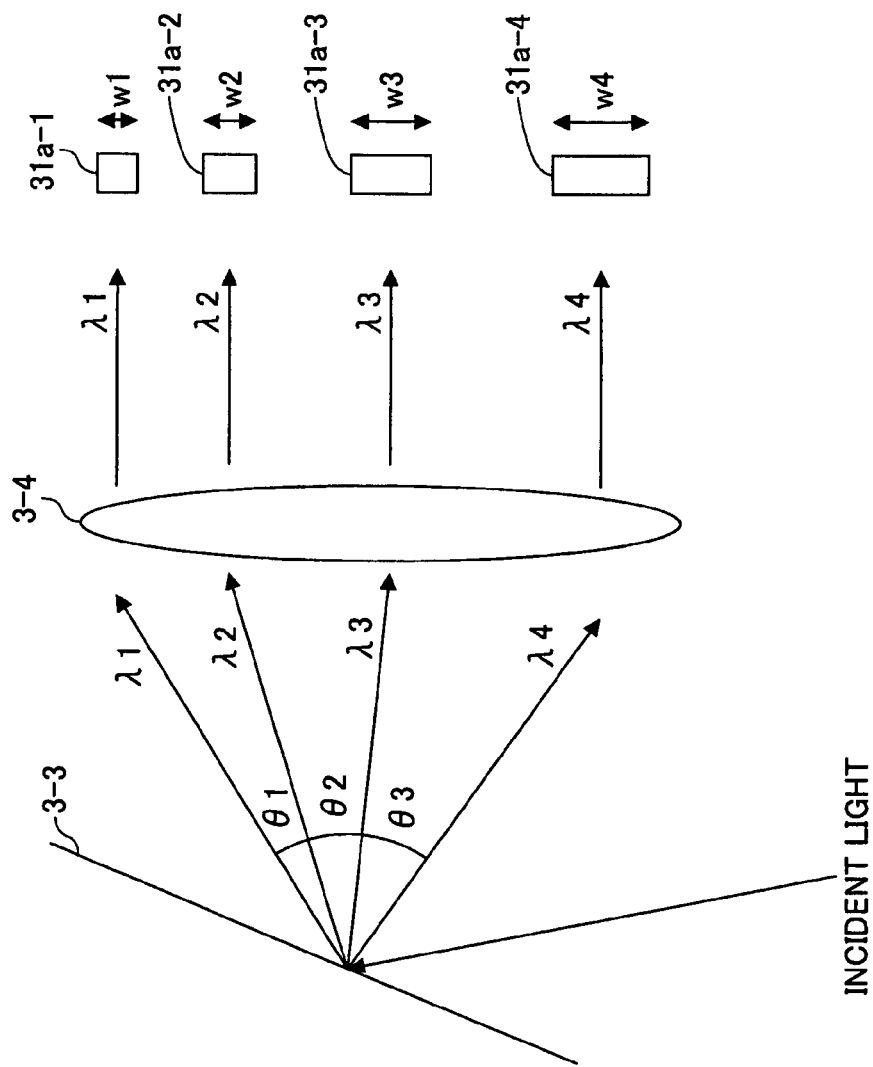
FIG. 6 illustrates light beams incident on MEMS mirrors.

FIG. 6 illustrates light beams with different wavelengths focused onto the corresponding MEMS mirrors 31a. WDM light is incident on the diffraction grating 3-3 and separated into dispersed light components with four different wavelengths $\lambda 1$-$\lambda 4$. The wavelength becomes longer as the subscript number increases. In this example, $\lambda 1$ is the shortest wavelength and $\lambda 4$ is the longest one ($\lambda 1 < \lambda 2 < \lambda 3 < \lambda 4$).

The light components with wavelengths of $\lambda 1$-$\lambda 4$ output from the diffraction grating 3-3 are collimated into parallel beams by the lens 3-4. The light component of $\lambda 1$ is focused on the MEMS mirror 31a-1. The light component of $\lambda 2$ is focused on the MEMS mirror 31a-2.

The light component of $\lambda 3$ is focused on the MEMS mirror 31a-3. The light component of $\lambda 4$ is focused on the MEMS mirror 31a-4. If the MEMS mirrors 31a-1 through 31a-4 have mirror widths of W1-W4, the relationship between the mirror widths becomes W1<W2<W3<W4.

In the diffraction grating 3-3, the angle of dispersion becomes greater as the wavelength shifts to the longer side at a constant interval. In the example of FIG. 6, dispersion angles satisfy the relationship $\theta 1 < \theta 2 < \theta 3$. For this reason, the WSS 3 is configured to have the MEMS mirror pitch increasing toward the long wavelength side, and have the MEMS mirror width increasing in accordance with the increase of the pitch, in order to guarantee a desired pass band.

If the central wavelength of the WDM channel specified by the ITU-T grid is incident on the center of the mirror, the pass-band characteristic becomes satisfactory. Accordingly, the width of the MEMS mirror is set greater toward the longer wavelength side such that the light component of the central wavelength is coincident with the center of the mirror.

Figure 7:
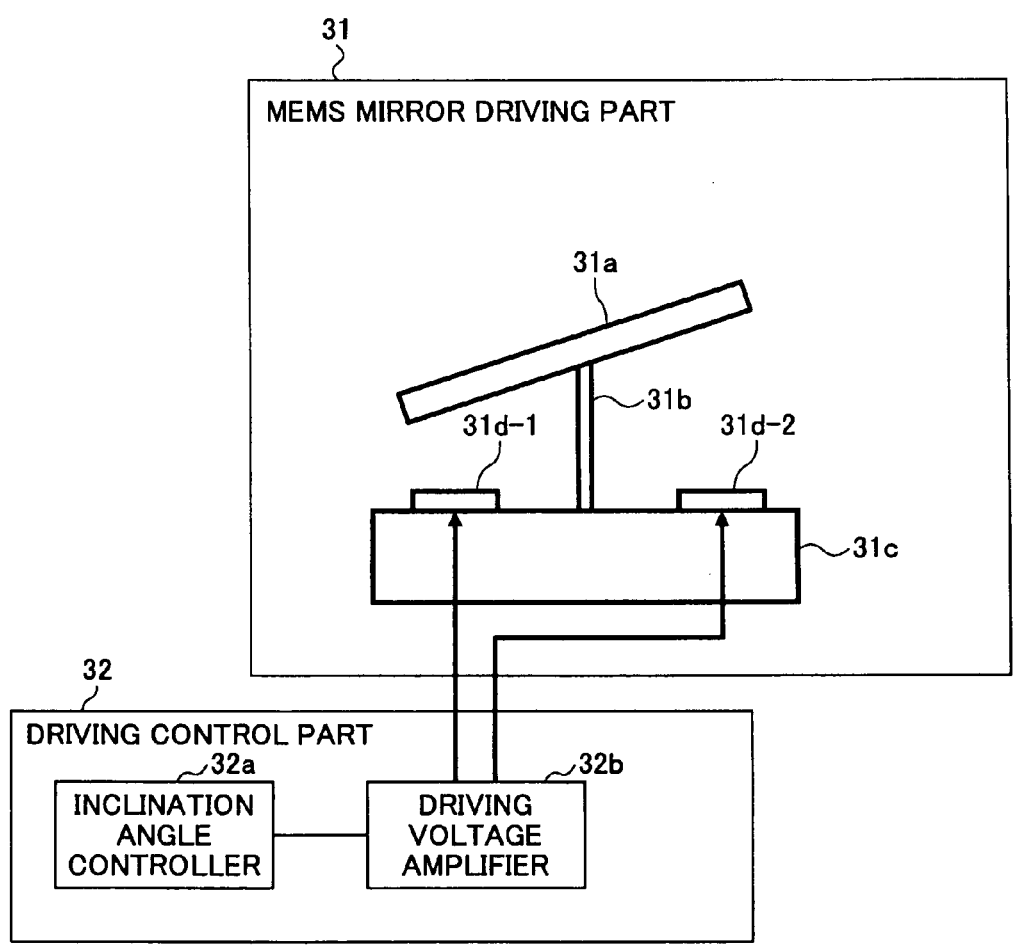
FIG. 7 illustrates an example of a MEMS mirror driving mechanism.

FIG. 7 is a schematic diagram of a driving mechanism of the MEMS mirror array 30. This figure illustrates a driving mechanism for a MEMS mirror corresponding to one wavelength of the MEMS mirror array 30. The MEMS mirror driving part 31 includes a MEMS mirror 31a, a torsion bar 31b, a stage 31c, and electrodes 31d-1 and 31d-2.

The MEMS mirror 31a is connected to one end of the torsion bar 31b. The other end of the torsion bar 31b is connected to the stage 31c. The electrodes 31d-1 and 31d-2 are arranged on the stage 31c.

The driving control part 32 has an inclination angle controller 32a and a driving voltage amplifier 32b. The inclination angle controller 32a includes a FPGA (field programmable gate array), a memory, a D/A converter, etc. (not shown).

The inclination angle controller 32a has initial value voltage information supplied from the optical network management apparatus 10. The inclination angle controller 32a converts this voltage information to an analog voltage signal, and transmits the analog signal to the driving voltage amplifier 32b. The initial value voltage information is used to guide the light beam reflected from each MEMS mirror toward the predetermined output port, which information is supplied as a logical information item (a digital value) from the optical network management apparatus 10.

The driving voltage amplifier 32b amplifies the analog voltage signal transmitted from the inclination angle controller 32a to generate a driving voltage, and applies the driving voltage to either the electrodes 31d-1 or 31d-2 of the MEMS mirror driving part 31.

The driving voltage is applied one of the electrodes 31d-1 and 31d-2. Due to the electrostatic force between the electrode 31d-1 (or 31d-2) and the MEMS mirror 31a, the MEMS mirror 31a inclines at a prescribed angle in a prescribed direction, whereby the inclination angle of the mirror is controlled.

The MEMS mirror 31a inclines toward the electrode to which the driving voltage is applied. If the driving voltage of a prescribed level is applied to the electrode 31d-1, the left-hand-side edge of the MEMS mirror 31a in the drawing comes down, while the right-hand-side edge thereof goes up, so as to make an inclination angle in accordance with the applied driving voltage. If the driving voltage of a prescribed level is applied to the electrode 31d-2, the right-hand-side edge of the MEMS mirror 31a in the drawing comes down, while the left-hand-side edge thereof goes up, so as to make an inclination angle in accordance with the applied driving voltage.

Figure 8:
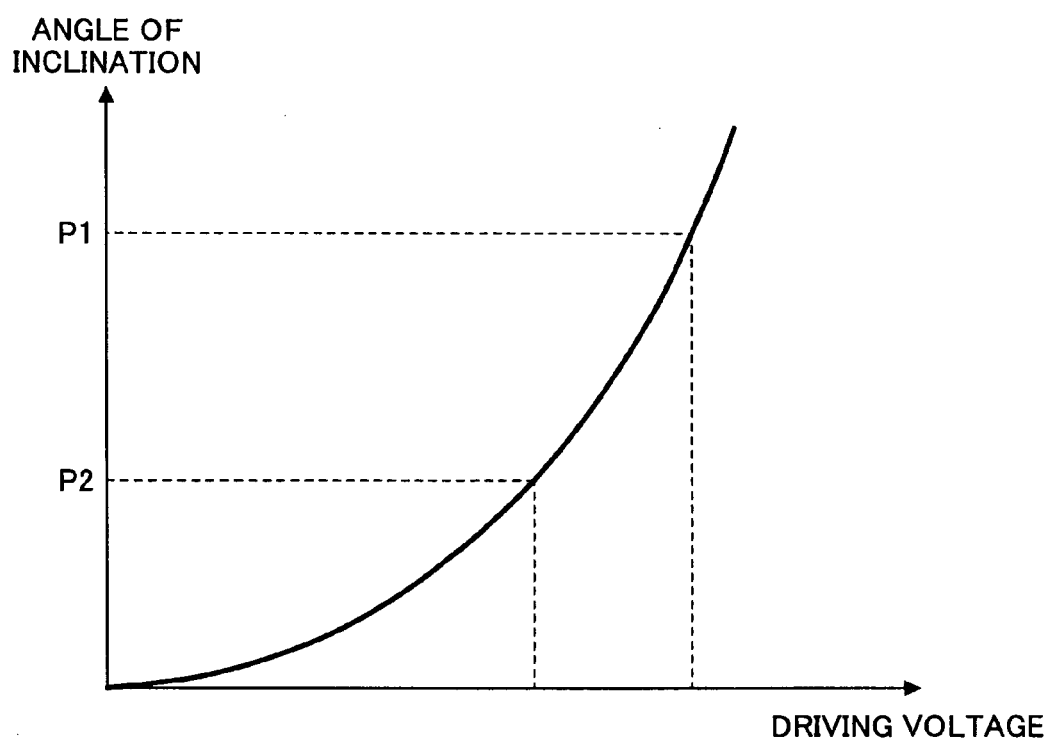
FIG. 8 is a graph illustrating a relationship between driving voltage and inclination angle of MEMS mirror.

FIG. 8 is a graph plotting inclination angle of the MEMS mirror as a function of applied driving voltage. The inclination angle of the MEMS mirror can be approximated with a squared-law characteristic with respect to the driving voltage. Accordingly, to achieve a large inclination angle, the driving voltage is raised.

For example, with the port arrangement illustrated in FIG. 3 and FIG. 4, in order to optically connect the return beam to port P1 (by tilting the MEMS mirror at a prescribed angle to output the light beam from the port P1), a greater driving voltage is applied than in the case of connecting to port P2.

This is because the inclination angle of the MEMS mirror 31a to connect the return beam to port P2 is greater than the inclination angle of the MEMS mirror 31a to connect the return beam to port P1.

The power consumption of the WSS 3 decreases when the return beam is connected to an output port determined by a smaller inclination angle. In other words, if an inclination angle for guiding the beam to one output port is greater than that for guiding the beam to the other port, using the other output port determined by the smaller inclination angle can reduce the power consumption of the WSS.

If the width of the MEMS mirror increases (without changing the thickness of the mirror and the shape of the torsion bar), the weight of the MEMS mirror 31a increases, and therefore the resonant frequency of the MEMS lowers. This is expressed by the following equation. With the spring constant k of the torsion bar 31b and the weight m of the MEMS mirror 31a, the resonant frequency f is expressed by Equation (1).

$$f = (1/2\pi)*(k/m)^{1/2} \tag{1}$$

It is understood from Equation (1) that the resonant frequency f lowers as the weight m increases with the increased width of MEMS mirror.

As the resonant frequency f lowers, the inclination angle of the MEMS mirror 31a becomes greater under the application of the same driving voltage. If the driving voltage is V, the inclination angle θ of the MEMS mirror 31a is expressed by Equation (2), where α is a proportional constant.

$$\theta = \alpha * V^2 / f \tag{2}$$

It is understood from Equation (2) that the inclination angle θ of the MEMS mirror 31a becomes greater as the resonant frequency f lowers.

From the foregoing, as the MEMS mirror is located closer to the longer wavelength side, the width and therefore the weight of the mirror increase, which results in lowered resonant frequency. Under the application of the same driving voltage, the inclination angle of the MEMS mirror 31a becomes greater. This means that the driving voltage used to tilt the MEMS mirror 31a to a predetermined angle become lower as the MEMS mirror 31a is located closer to the longer wavelength side.

As has been explained above, the MEMS mirror array 30 has a characteristic such that a driving voltage used to optically connect a MEMS mirror on the longer wavelength side to a predetermined output port is lower than that used to optically connect the MEMS mirror on the shorter wavelength side to the predetermined output port.

The WSS characteristics can be restated as follows. The power consumption of a WSS decreases if an output port corresponding to a smaller inclination angle of a MEMS mirror is selected. The power consumption of the WSS also decreases when switching is carried out at a longer wavelength side of signal light.

Figure 9:
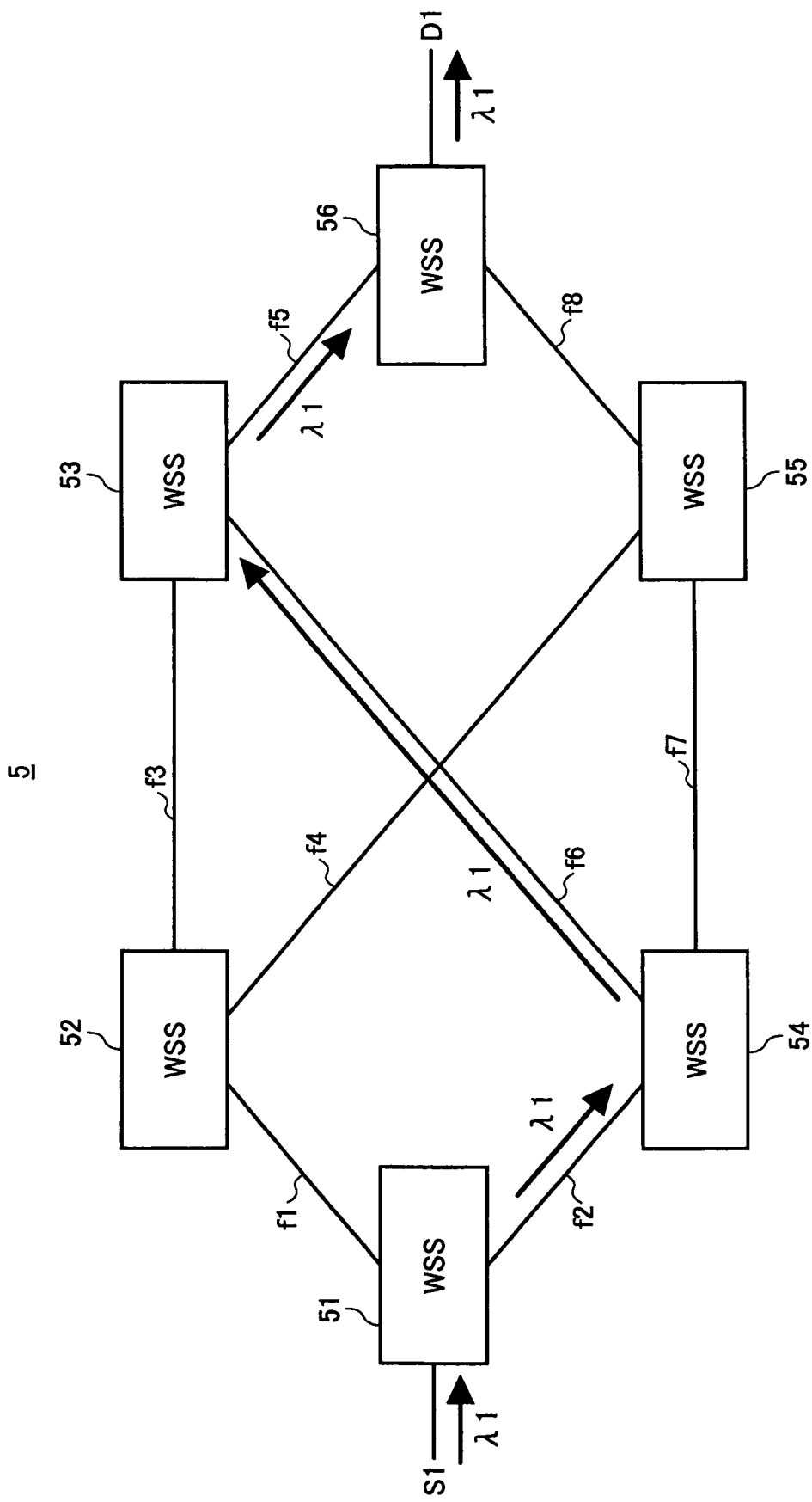
FIG. 9 illustrates a structural example of an optical network.

Next, explanation is made of a typical path establishing technique on the assumption that the power consumption is constant among multiple WSSs. FIG. 9 illustrates an example of an optical network 5 which includes WSSs 51-56. The WSSs 51-56 have the same function and have a 1×2 structure (that is, a 1-input 2-output structure or a 2-input 1-output structure).

The WSS 51 is connected to WSS 52 via an optical fiber f1 and to WSS 54 via an optical fiber f2. The WSS 52 is connected to WSS 53 via an optical fiber f3 and to WSS 55 via an optical fiber f4.

The WSS 53 is connected to WSS 56 via an optical fiber f5. The WSS 54 is connected to WSS 53 via an optical fiber f6 and to WSS 55 via an optical fiber f7. The WSS 55 is connected to WSS 56 via an optical fiber f8.

It is assumed that the wavelengths available in the optical network 5 are λ1 (short wavelength) through λ4 (long wavelength), and a request for establishing a route between point S1 to point D1 is made. The route is determined so as to minimize the total power consumption of the route.

In this case, power consumption of each of the WSSs 51-56 is managed as a cost value, and a route for minimizing the total cost value is to be selected. The power consumption of the WSSs 51-56 is assumed to be a constant value, for example, 100.

In the optical network 5, the total cost value always becomes 400 (100×4=400) to establish a route from point S1 to point D1 whatever path is selected. Accordingly, an arbitrary path can be selected. For example, paths expressed as S1→WSS 51→WSS 54→WSS 53→WSS 56→D1 may be selected. An arbitrary wavelength may also be used. For example, λ1 is allocated.

In reality, a WSS has a characteristic that the power consumption varies depending on a connection port and a wavelength being used. However, in the path establishing technique illustrated in FIG. 9, the characteristic of the WSS is not taken into account because the power consumption of all the WSSs is treated as being constant.

Accordingly, with the conventional path establishment, the calculation result of the power consumption of the network becomes the same whatever path is selected or whatever wavelength is used. This means that the optimal route with the minimum power consumption is not correctly determined.

The embodiments discussed herein are provided to overcome the above-described problem in the conventional technique and establish the optimal route with a high degree of accuracy to realize a power-saving optical network.

Figure 10:
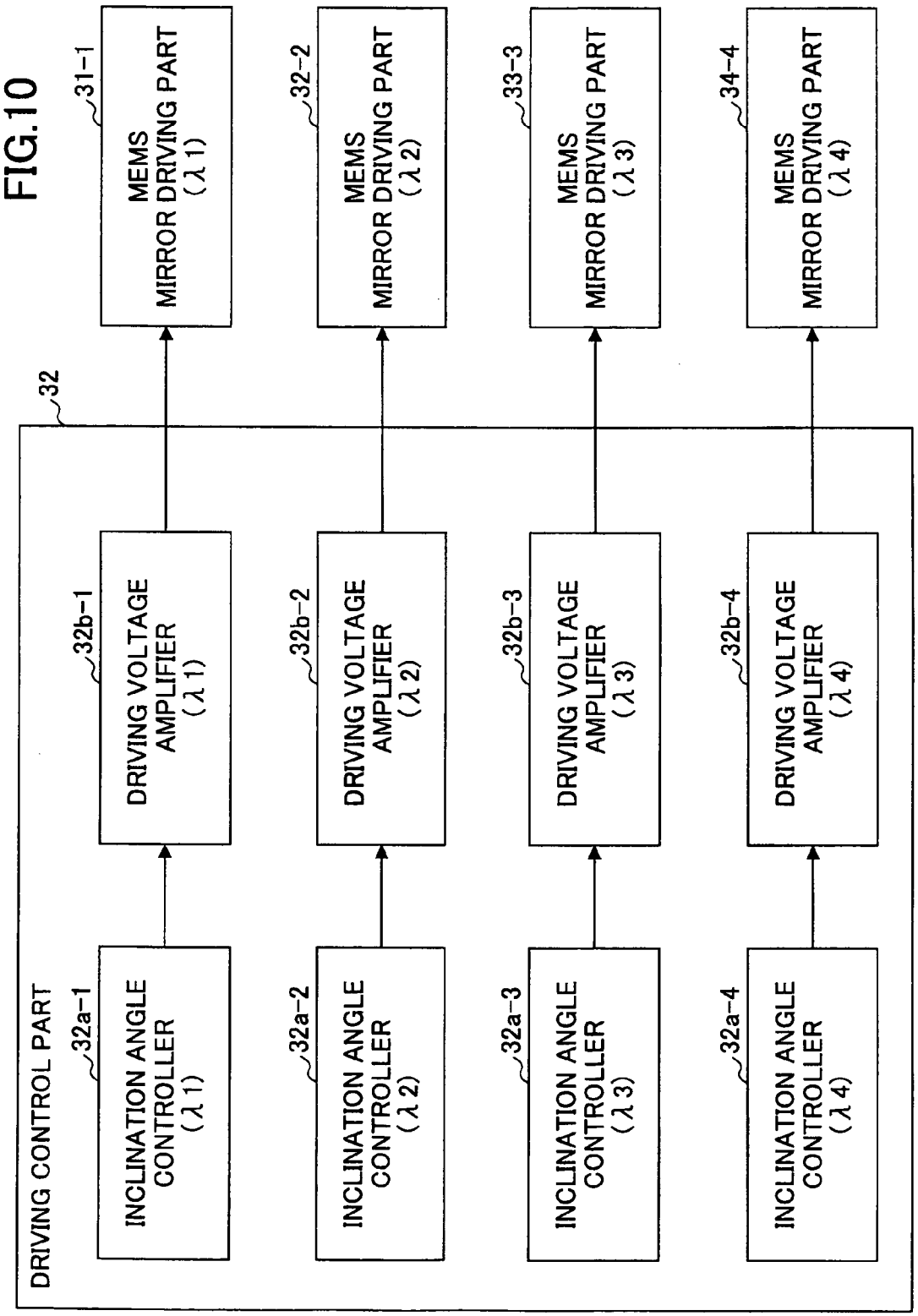
FIG. 10 illustrates an example of a driving control part in a WSS.

Next, power-saving control in the optical communication system 1 is described in detail. FIG. 10 illustrates a structure of a driving control part of the WSS 3. It is assumed for the explanatory purpose that the WSS 3 switches and selects wavelengths among λ1 through λ4. The driving control part 32 has a combination of an inclination angle controller and a driving voltage amplifier for each of the wavelengths λ1-λ4.

More particularly, the driving control part 32 has an inclination angle controller 32*a*-1 and a driving voltage amplifier 32*b*-1, which combination serves as a driving control mechanism for controlling an MEMS mirror driving part 31-1 corresponding to a wavelength λ1 to adjust the inclination angle of the associated MEMS mirror. An inclination angle controller 32*a*-2 and a driving voltage amplifier 32*b*-2 are provided as a driving control mechanism for controlling an MEMS mirror driving part 31-2 which corresponds to a wavelength λ2 to adjust the inclination angle of the associated MEMS mirror.

An inclination angle controller 32*a*-3 and a driving voltage amplifier 32*b*-3 are provided as a driving control mechanism for controlling an MEMS mirror driving part 31-3 which corresponds to a wavelength λ3 to adjust the inclination angle of the associated MEMS mirror. An inclination angle controller 32*a*-4 and a driving voltage amplifier 32*b*-4 are provided as a driving control mechanism for controlling an MEMS mirror driving part 31-4 corresponding to a wavelength λ4 to adjust the inclination angle of the associated MEMS mirror.

Figure 11:
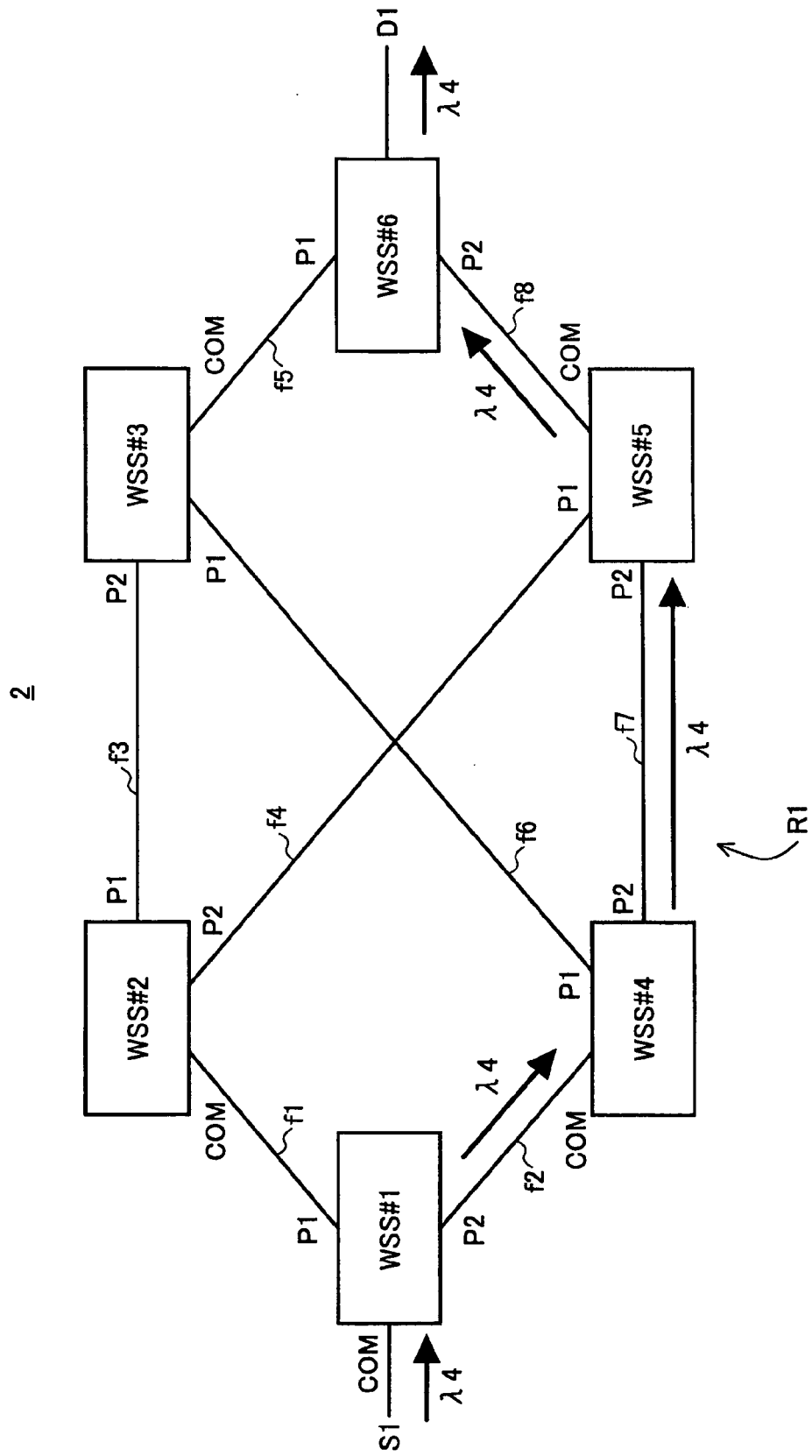
FIG. 11 illustrates a structural example of an optical network.

FIG. 11 illustrates a structural example of an optical network 2. The optical network 2 includes multiple WSSs #1-#6. The WSSs #1-#6 have the same function and employ a 1×2 structure (i.e., a 1-input 2-output structure or a 2-input 1-output structure). The optical network management apparatus 10 is omitted in this drawing.

Each of the WSSs #1-#6 has a port COM, a port P1 and a port P2 (see FIG. 2). In the following description, the port number increases as the inclination angle of the MEMS mirror decreases. Accordingly, a WSS with a connection port identified by a greater port number has lower power consumption.

For example, of two output ports P1 and P2 are used, connecting to port P2 leads to a decreased inclination angle of the MEMS mirror, rather than connecting to port P1, and accordingly, power consumption of the WSS is reduced when output port P2 is selected rather than output port P1.

Concerning the connection of the WSSs #1-#6, the output port P1 of WSS #1 is connected via an optical fiber f1 to the input port COM of WSS #2, and the output port P2 of WSS #1 is connected via an optical fiber f2 to the input port COM of WSS #4.

The output port P1 of WSS #2 is connected via an optical fiber f3 to the input port P2 of WSS #3, and the output port P2 of WSS #2 is connected via a fiber f4 to the input port P1 of WSS #5.

The output port P1 of WSS #4 is connected via an optical fiber f6 to the input port P1 of WSS #3, and the output port P2 of WSS #4 is connected via a fiber f7 to the input port P2 of WSS #5.

The output port COM of WSS #3 is connected via an optical fiber f5 to the input port P1 of WSS #6, and the output port COM of WSS #5 is connected via an optical fiber f8 to the input port P2 of WSS #6

FIG. 12 illustrates an example of a power cost value table T1. The power cost value table T1 is managed by the control part 11 of the optical network management apparatus 10. The power cost value table T1 describes power cost values of the WSSs in association with the connection ports and the wavelengths available in the network. The power cost values includes a power cost value in the connection mode (referred to as a "connection-mode power cost value") and a power cost value in the standby mode (referred to as a "standby-mode power cost value").

The connection-mode power cost value denotes a power consumption level of the WSS when this WSS is connected to a counterpart WSS and carries out switching operations at each of the wavelengths λ1-λ4. In this state, both the inclination angle controller and the driving voltage amplifier of the corresponding wavelength are powered ON. The standby-mode power cost value denotes a power consumption level of the WSS when this WSS is in the standby mode without performing switching operations. In this state, the inclination angle controller is powered ON, while the driving voltage amplifier is powered OFF.

Explanation is made of each of the numerical values recorded in the power cost value table T1. If a port P1 is selected as the output port of arbitrary one of WSS #1-#6, and if signal light of wavelength λ1 is output from this port P1, then the connection-mode power cost value of the WSS is 56, while the standby-mode power cost value is 20.

When signal light of wavelength λ2 is output from the port P1, the connection-mode power cost value of WSSs #1-#6 is 54, while the standby-mode power cost value is 20. When signal light of wavelength λ3 is output from the port P1, the connection-mode power cost value of WSSs #1-#6 is 52, while the standby-mode power cost value is 20. When signal light of wavelength λ4 is output from the port P1, the connection-mode power cost value of WSSs #1-#6 is 50, while the standby-mode power cost value is 20.

If a port P2 is selected as the output port, and if signal light of wavelength λ1 is output from the port P2, then the connection-mode power cost value of WSSs #1-#6 is 36, while the standby-mode power cost value is 20.

When signal light of wavelength λ2 is output from the port P2, the connection-mode power cost value of WSS #1-#6 is 34, while the standby-mode power cost value is 20. When signal light of wavelength λ3 is output from the port P2, the connection-mode power cost value of WSS #1-#6 is 32, while the standby-mode power cost value is 20. When signal light of wavelength λ4 is output from the port P2, the connection-mode power cost value of WSS #1-#6 is 30, while the standby-mode power cost value is 20.

The values in the power cost value table T1 reflect the WSS characteristic that "the power consumption is reduced as the connection port number is increased and as the wavelength being used is longer." Accordingly, if the connection port number is the same, the connection-mode power cost value can be reduced as a longer-side wavelength is used. If connection ports of different port numbers are used, the connection-mode power cost value can be reduced by selecting a port with a greater port number (by connecting to P2 rather than P1).

Since the standby-mode power cost value denotes a power cost value of the WSS when this WSS is disconnected, the standby-mode power cost value is independent of the connection port and the wavelength being used. Accordingly, there is no change in the standby-mode power cost value even if the connection port number and/or the wavelength vary.

The optical network management apparatus 10 selects a route such that the power consumption cost value becomes the minimum based upon the power cost value table T1 when determining a route from the input point S1 to the output point D1 on the optical network 2.

Referring to the registered values in the power cost value table T1, a value 30 is the lowest one among the connection-mode power cost values. Accordingly, the optical network management apparatus 10 selects a route such that as many WSSs using the output port P2 are included as possible and communication (or connection) is made using signal light of $\lambda 4$. From this point of view, a route with the minimum power consumption is S1→WSS#→1→WSS#4→WSS#5→WSS#6→D1.

The power consumption can be minimized by selecting the route S1→WSS#1→WSS#4→WSS#5→WSS#6→D1 that includes the greatest number of WSSs using the output port P2 and communicates using signal light $\lambda 4$ (referred to as "R1").

Then, based upon the registered values in the power cost value table T1, the power consumption cost value of the optical network 2 is calculated upon selection of route R1. First, at WSS#1, the connection-mode power cost value with respect to the currently used wavelength $\lambda 4$ is 30. In other words, both the inclination angle controller 32a-4 and the driving voltage amplifier 32b-4 corresponding to $\lambda 4$ are powered ON, and the power consumption becomes 30.

With respect to unused wavelength $\lambda 1$, the standby-mode power cost value is 20. In other words, the inclination angle controller 32a-1 corresponding to $\lambda 1$ is powered ON, while the driving voltage amplifier 32b-1 corresponding to $\lambda 1$ is powered OFF. The power consumption cost value for $\lambda 1$ becomes 20. The same applies to unused wavelengths A3 and A4, and the power consumption cost values for A3 and A4 become 20, respectively.

Accordingly, the power consumption cost value of the WSS#1 becomes 90 (which equals $30_{(\lambda 4)}+20_{(\lambda 1)}+20_{(\lambda 2)}+20_{(\lambda 3)}$). The same applies to WSS#4, WSS#5, and WSS#6, and the power consumption cost values of these switches become 90.

For WSS#2, a path is not established and it is in the standby mode. In this state, the inclination angle controllers 32a-1 through 32a-4 corresponding to the wavelengths $\lambda 1$-$\lambda 4$ are power ON, while the driving voltage amplifiers 32b-1 through 32b-4 corresponding to the wavelengths $\lambda 1$-$\lambda 4$ are powered OFF.

Since each of the standby-mode power cost values for wavelengths $\lambda 1$-$\lambda 4$ is 20, the power consumption cost value of the WSS#2 becomes 80 (which equals $20_{(\lambda 1)}+20_{(\lambda 2)}+20_{(\lambda 3)}+20_{(\lambda 4)}$). The same applies to WSS#3, which has the power consumption cost value of 80 as in WSS#2. As a result, the total power consumption cost value of the optical network 2 become 520 ($90 \times 4_{(WSSs\#1, \#4, \#5, \#6)}+80 \times 2_{(WSSs\#2\ and\ \#3)}=520$).

To summarize the power-saving control in the optical network 2, the optical network management apparatus 10 brings the inclination angle controllers 32a-1 through 32a-4 corresponding to all the wavelengths available in the network into the WAKE state, brings the driving voltage amplifiers 32b corresponding to the unused wavelengths into the SPEEP state, and brings the driving voltage amplifier 32b corresponding to the currently used wavelength into the WAKE state, for each of the WSSs through which traffic passes.

For the WSSs through which traffic does not pass, the optical network management apparatus 10 brings the inclination angle controller 32a corresponding to all the available wavelengths into the WAKE state, and brings the driving voltage amplifiers 32b corresponding to all the available wavelengths into the SLEEP state. In this context, in the "SLEEP" state the equipment or component to be controlled is powered off (with the power consumption substantially zero), and in the "WAKE" state the equipment or component to be controlled is powered on.

FIG. 13 illustrates operating statuses of the inclination angle controllers and the driving voltage amplifiers, in which power saving control of the optical network 2 is depicted in a table. At WSS#1 in this optical network 2, the wavelengths $\lambda 1$-$\lambda 3$ are unused, while $\lambda 4$ is used to carry out switching for optical connection.

In this state at WSS#1, the inclination angle controllers 32a-1 through 32a-4 corresponding to the wavelengths $\lambda 1$-$\lambda 4$ are all powered ON. The driving voltage amplifiers 32b-1 through 32b-3 corresponding to $\lambda 1$-$\lambda 3$ are powered OFF, while the driving voltage amplifier 32b-4 corresponding to the wavelength $\lambda 4$ is powered ON.

WSS#2 and WSS#3 are in the standby mode. The inclination angle controllers 32a-1 through 32a-4 corresponding to the wavelengths $\lambda 1$-$\lambda 4$ are all powered ON, and the driving voltage amplifiers 32b-1 through 32b-4 corresponding to $\lambda 1$-$\lambda 4$ are all powered OFF in WSS#2 and WSS#3.

At WSS#4, WSS#5 and WSS#6, the wavelengths $\lambda 1$-$\lambda 3$ are unused, while $\lambda 4$ is used to carry out switching for optical connection. In this state, the inclination angle controllers 32a-1 through 32a-4 corresponding to the wavelengths $\lambda 1$-$\lambda 4$ are all powered ON. The driving voltage amplifiers 32b-1 through 32b-3 corresponding to $\lambda 1$-$\lambda 3$ are powered OFF, while the driving voltage amplifier 32b-4 corresponding to the wavelength $\lambda 4$ is powered ON.

In this manner, in the optical network using WSSs, adjacent WSSs are connected at an output port determined by the minimum inclination angle of the MEMS mirror, and signal light with the longest wavelength in the wavelengths available in the network is used for the optical communications. With this arrangement, a route with the minimum power consumption can be established efficiently and accurately, and power saving in the optical network can be realized.

For those WSSs through which traffic passes, the inclination angle controllers corresponding to all the available wavelengths are brought into the WAKE state, and the driving voltage amplifiers corresponding to the unused wavelengths are brought into the SLEEP state, while bringing the driving voltage amplifier corresponding to the currently used wavelength into the WAKE state.

For those WSSs through which traffic does not pass, the inclination angle controllers corresponding to all the available wavelengths are brought into the WAKE state, and the driving voltage amplifiers corresponding to all the available wavelengths are brought into the SLEEP state. By performing the voltage control on the driving control part of each WSS at the optical network management apparatus 10, power consumption of the optical network can be reduced.

Figure 14:
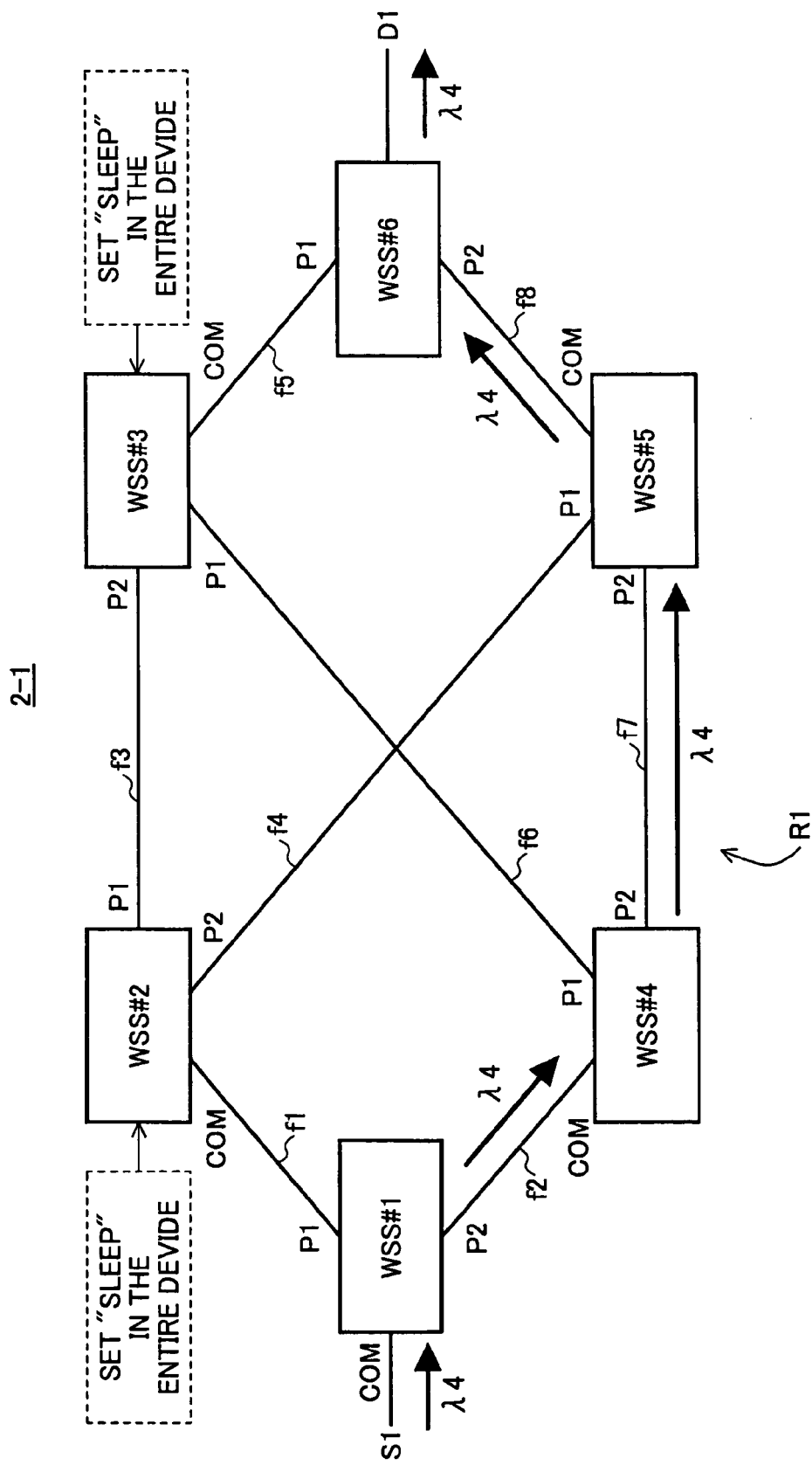
FIG. 14 illustrates a structural example of an optical network.

Next, modifications are described below. In the first modification, for a WSS through which traffic does not pass, the entirety of the device is brought into the SLEEP state to further enhance power saving in the optical network. FIG. 14 illustrates a structural example of the optical network 2-1. The optical network 2-1 has the same topology and configuration of WSSs #1-#6 as the optical network 2 illustrated in FIG. 11, and the optimal route R1 is establishes as in FIG. 11.

In the above-described optical network 2, the WSS#2 and WSS#3 through which traffic does not pass are brought into the standby mode. In the first modification, the entire devices of WSS#2 and WSS#3 are brought into the SLEEP state. More particularly, the inclination angle controllers and the driving voltage amplifiers corresponding to all the wavelengths are powered OFF in each of the WSS#2 and WSS#3 to further reduce the power consumption of the optical network as a whole.

The optical network management apparatus 10 brings the WSS#2 and WSS#3 through which traffic does not pass into the SLEEP state in the optical network 2-1. In WSS#2, the inclination angle controllers 32a-1 through 32a-4 corresponding to the wavelengths $\lambda 1$-$\lambda 4$ are powered OFF, and the driving voltage amplifiers 32b-1 through 32b-4 corresponding to the wavelengths $\lambda 1$-$\lambda 4$ are powered OFF.

Similarly, in WSS#3, the inclination angle controllers 32a-1 through 32a-4 corresponding to the wavelengths $\lambda 1$-$\lambda 4$ are powered OFF, and the driving voltage amplifiers 32b-1 through 32b-4 corresponding to the wavelengths $\lambda 1$-$\lambda 4$ are powered OFF.

By performing this type of power saving control, the total power consumption cost value in the optical network 2-1 becomes 360 (calculated by 520−160=90×4=360). To summarize the power saving control of the first modification, for WSSs through which traffic pass, the optical network management apparatus 10 brings the inclination angle controllers corresponding to all the wavelengths into the WAKE state, brings the driving voltage amplifiers corresponding to the unused wavelengths into the SLEEP state, and brings the driving voltage amplifier corresponding to the currently used wavelength into the WAKE state. For WSSs through which traffic does not pass, the optical network management apparatus 10 brings the inclination angle controllers and the driving voltage amplifiers corresponding to all the wavelengths into the SLEEP state.

FIG. 15 illustrates operating statuses of the inclination controllers and the driving voltage amplifiers of the WSSs #1-#6, in which power saving control of the first modification is depicted in a table. At WSS#1 in the optical network 2-1, the wavelengths $\lambda 1$-$\lambda 3$ are unused, while $\lambda 4$ is used to carry out switching for optical connection.

In this state at WSS#1, the inclination angle controllers 32a-1 through 32a-4 corresponding to the wavelengths $\lambda 1$-$\lambda 4$ are all powered ON. The driving voltage amplifiers 32b-1 through 32b-3 corresponding to $\lambda 1$-$\lambda 3$ are powered OFF, while the driving voltage amplifier 32b-4 corresponding to the wavelength $\lambda 4$ is powered ON.

At each of WSS#2 and WSS#3, the entirety of the device is brought into the SLEEP state. Accordingly, the inclination angle controllers 32a-1 through 32a-4 corresponding to the wavelengths $\lambda 1$-$\lambda 4$ are all powered OFF, and the driving voltage amplifiers 32b-1 through 32b-4 corresponding to $\lambda 1$-$\lambda 4$ are all powered OFF.

At WSS#4, WSS#5 and WSS#6, the wavelengths $\lambda 1$-$\lambda 3$ are unused, while $\lambda 4$ is used to carry out switching for optical connection. In this state, the inclination angle controllers 32a-1 through 32a-4 corresponding to the wavelengths $\lambda 1$-$\lambda 4$ are all powered ON. The driving voltage amplifiers 32b-1 through 32b-3 corresponding to $\lambda 1$-$\lambda 3$ are powered OFF, while the driving voltage amplifier 32b-4 corresponding to the wavelength $\lambda 4$ is powered ON.

In this manner, the first modification is adapted to bring the entirety of a WSS device through which traffic does not pass into the SLEEP state to further enhance power saving in the optical network.

The second modification is described. In the second modification, the inclination angle controllers and the driving voltage amplifiers corresponding to unused wavelengths are brought into the SLEEP state even at a WSS through which traffic passes, to enhance the power saving of the optical network.

Figure 16:
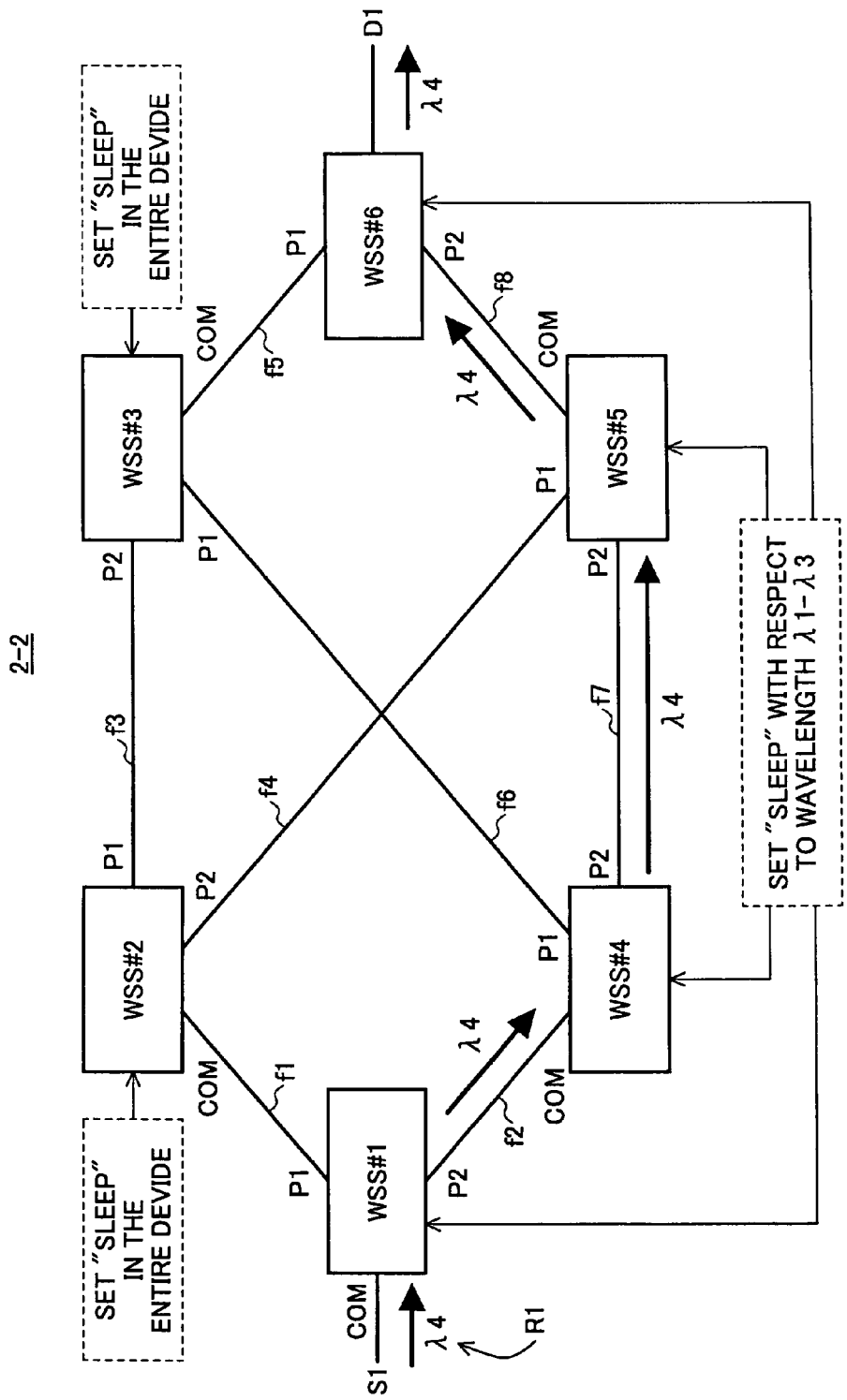
FIG. 16 illustrates a structural example of an optical network.

FIG. 16 illustrates a structural example of the optical network 2-2. The optical network 2-2 has the same topology and configuration of WSSs #1-#6 as the optical network 2 illustrated in FIG. 11, and the optimal route R1 is establishes as in FIG. 11.

In the second modification, at WSS#2 and WSS#3 through which traffic does not pass, the entirety of the WSS device is brought into the SLEEP state. In addition, at WSS#1, WSS#4, WSS#5, and WSS#6 through which traffic pass, the inclination angle controllers and the driving voltage amplifiers corresponding to unused wavelengths $\lambda 1$-$\lambda 3$ are brought into the SLEEP state to further reduce the power consumption of the optical network as a whole.

In the optical network 2-2, the optical network management apparatus 10 brings the entire devices of WSS#2 and WSS#3 through which traffic does not pass into the SLEEP state. The optical network management apparatus 10 also controls the WSS#1, WSS#4, WSS#5 and WSS#6 so as to bring the inclination angle controllers and the driving voltage amplifiers corresponding to the unused wavelengths $\lambda 1$-$\lambda 3$ into the SLEEP state.

At WSS#1, the inclination angle controllers 32a-1 through 32a-3 corresponding to the wavelengths $\lambda 1$-$\lambda 3$ are powered OFF, and the driving voltage amplifiers 32b-1 through 32b-3 corresponding to the wavelengths $\lambda 1$-$\lambda 3$ are powered OFF. At WSS#4, the inclination angle controllers 32a-1 through 32a-3 corresponding to the wavelengths $\lambda 1$-$\lambda 3$ are powered OFF, and the driving voltage amplifiers 32b-1 through 32b-3 corresponding to the wavelengths $\lambda 1$-$\lambda 3$ are powered OFF.

At WSS#5, the inclination angle controllers 32a-1 through 32a-3 corresponding to the wavelengths $\lambda 1$-$\lambda 3$ are powered OFF, and the driving voltage amplifiers 32b-1 through 32b-3 corresponding to the wavelengths $\lambda 1$-$\lambda 3$ are powered OFF. At WSS#6, the inclination angle controllers 32a-1 through 32a-3 corresponding to the wavelengths $\lambda 1$-$\lambda 3$ are powered OFF, and the driving voltage amplifiers 32b-1 through 32b-3 corresponding to the wavelengths $\lambda 1$-$\lambda 3$ are powered OFF.

With this arrangement of the second modification, the standby mode is removed from a network component or network element, and instead, the SLEEP state is employed. Consequently, the total power consumption of the optical network 2-2 is further reduced to 120 (30×4=90) To summarize the power saving control of the second modification, for WSSs through which traffic pass, the optical network management apparatus 10 brings the inclination angle controllers and the driving voltage amplifiers corresponding to the unused wavelengths into the SLEEP state, and brings the inclination angle controller and the driving voltage amplifier corresponding to the currently used wavelength into the WAKE state. For WSSs through which traffic does not pass, the optical network management apparatus 10 brings the inclination angle controllers and the driving voltage amplifiers corresponding to all the wavelengths into the SLEEP state.

FIG. 17 illustrates operating statuses of the inclination controllers and the driving voltage amplifiers of the WSSs #1-#6, in which power saving control of the second modification is depicted in a table. At WSS#1 in the optical network 2-2, the wavelengths λ1-λ3 are unused, while λ4 is used to carry out switching for optical connection.

In the second modification, at WSS#1, the inclination angle controllers 32a-1 through 32a-3 corresponding to the wavelengths λ1-λ3 are powered OFF, while the inclination angle controller 32a-4 corresponding to λ4 is powered ON. The driving voltage amplifiers 32b-1 through 32b-3 corresponding to λ1-λ3 are powered OFF, while the driving voltage amplifier 32b-4 corresponding to the wavelength λ4 is powered ON.

At each of WSS#2 and WSS#3, the entirety of the device is brought into the SLEEP state. Accordingly, the inclination angle controllers 32a-1 through 32a-4 corresponding to the wavelengths λ1-λ4 are all powered OFF, and the driving voltage amplifiers 32b-1 through 32b-4 corresponding to λ1-λ4 are all powered OFF.

At WSS#4, WSS#5 and WSS#6, the wavelengths λ1-λ3 are unused, while λ4 is used to carry out switching for optical connection. In this state, the inclination angle controllers 32a-1 through 32a-3 corresponding to the wavelengths λ1-λ3 are powered OFF, while the inclination angle controller 32a-4 corresponding to λ4 is powered ON. The driving voltage amplifiers 32b-1 through 32b-3 corresponding to λ1-λ3 are powered OFF, while the driving voltage amplifier 32b-4 corresponding to the wavelength λ4 is powered ON.

In this manner, the second modification is adapted to bring the inclination angle controllers corresponding to the unused wavelengths into the SLEEP state even at a WSS through which traffic passes, power saving in the optical network can be further enhanced.

Next, the third modification is described. In the third modification, at a WSS through which traffic passes, the inclination angle controllers and the driving voltage amplifiers corresponding to unused wavelengths are brought into the SLEEP state, and at a WSS through which traffic does not pass, the driving voltage amplifiers corresponding to all the wavelengths are brought into the SLEEP state.

In addition, at a WSS through which traffic does not pass, the inclination angle controller corresponding to a wavelength being used at a WSS through which traffic passes is maintained in the WAKE state.

Figure 18:
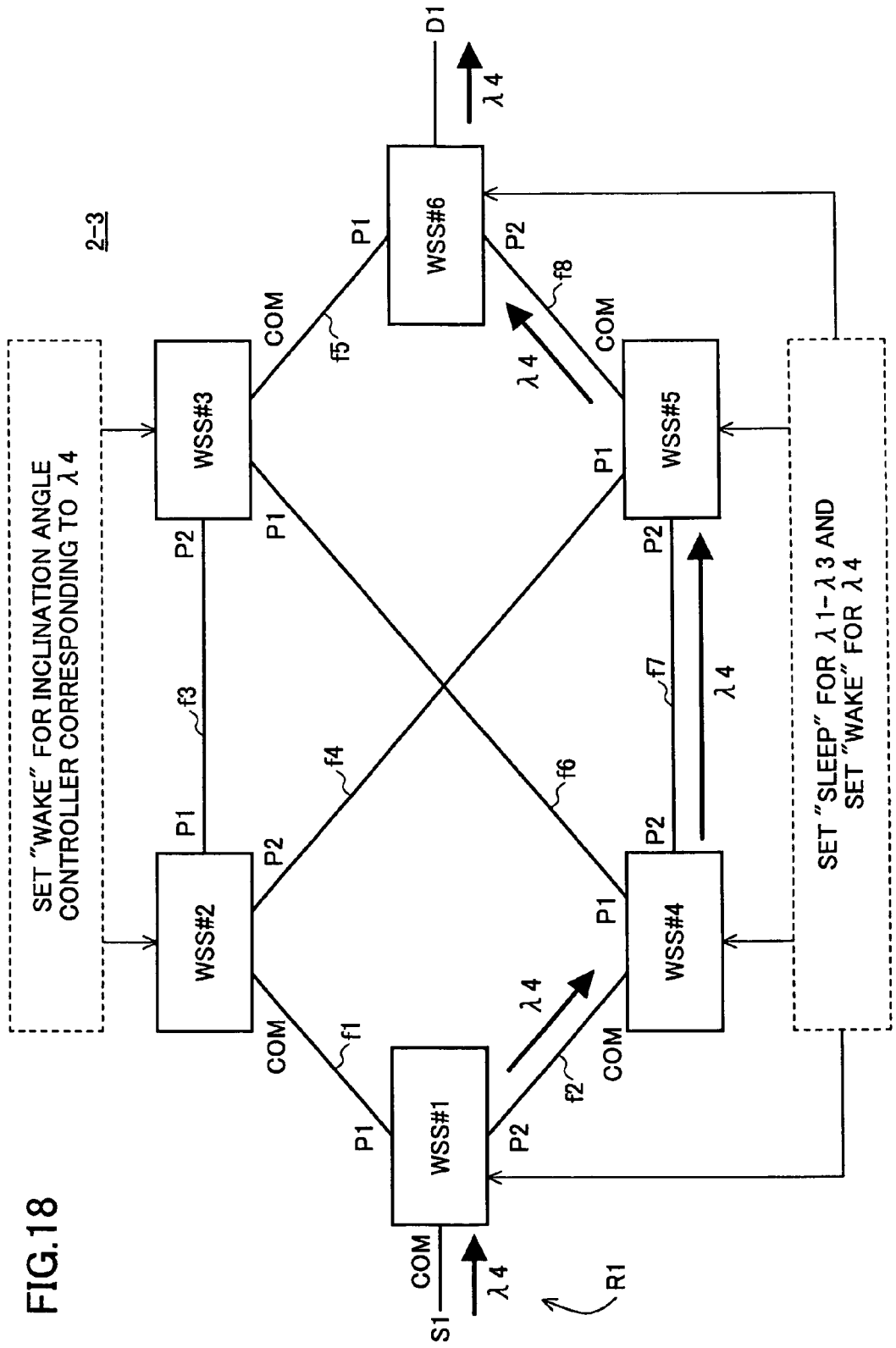
FIG. 18 illustrates a structural example of an optical network.

FIG. 18 illustrates a structural example of the optical network 2-3. The optical network 2-3 has the same topology and configuration of WSSs #1-#6 as the optical network 2 illustrated in FIG. 11, and the optimal route R1 is establishes as in FIG. 11.

In the optical network 2-3, the optical network management apparatus 10 controls for the WSS#1, WSS#4, WSS#5 and WSS#6 through which traffic passes so as to bring the inclination angle controllers and the driving voltage amplifiers corresponding to the unused wavelengths λ1-λ3 into the SLEEP state, and controls for the WSS#2 and WSS#3 through which traffic does not pass so as to bring the driving voltage amplifiers corresponding to all the wavelengths into the SLEEP state. In addition, the optical network management apparatus 10 controls for WSS#2 and WSS#3 so as to set the inclination angle controller corresponding to the wavelength λ4, which wavelength is currently used at WSS#1, WSS#4, WSS#5 and WSS#6 through which traffic passes, in the WAKE state.

In other words, at WSS#1, WSS#4, WSS#5 and WSS#6 through which traffic passes, the driving voltage amplifiers 32b-1 through 32b-3 and the inclination angle controllers 32a-1 through 32a-3 corresponding to the unused wavelengths λ1-λ3 are powered OFF, while the driving voltage amplifier 32b-4 and the inclination angle controller 32a-4 corresponding to the wavelength λ4 are powered ON. At the non-connected WSS#2 and WSS#3, the driving voltage amplifiers 32b-1 through 32b-4 corresponding to all the wavelengths λ1-λ4 are powered OFF.

Furthermore, at WSSs #1-#6, the inclination angle controllers 32a-1 through 32a-3 corresponding to the wavelength λ1-λ3 are powered OFF, while the inclination angle controller 32a-4 corresponding to wavelength λ4 is powered ON.

In general, when starting up WSSs, several tens seconds of time are taken to activate the FPGA and load data such as initial voltage information into the memory. Accordingly, it also takes several tens seconds to start up the inclination angle controller that includes an FPGA and a memory. In contrast, the driving voltage amplifier which includes a high-voltage amplifier is capable of high-speed start-up.

If the entirety of the WSS device is brought into the SLEEP state, it takes several tens seconds to restart the WSS. To avoid this, the inclination angle controller is maintained in the WAKE state, while the driving voltage amplifier is brought into the SLEEP state at a non-connected WSS through which traffic does not pass. This arrangement allows high-speed start-up, while reducing power consumption.

To summarize the power saving control of the third modification, for WSSs through which traffic passes, the optical network management apparatus 10 brings the inclination angle controllers and the driving voltage amplifiers corresponding to the unused wavelengths into the SLEEP state, and brings the inclination angle controller and the driving voltage amplifier corresponding to the currently used wavelength into the WAKE state. For WSSs through which traffic does not pass, the optical network management apparatus 10 brings the inclination angle controllers and the driving voltage amplifiers corresponding to the unused wavelengths into the SLEEP state, and brings the inclination angle controller corresponding to the wavelength currently used in the connected path in the WAKE state.

FIG. 19 illustrates operating statuses of the inclination controllers and the driving voltage amplifiers of the WSSs #1-#6, in which power saving control of the third modification is depicted in a table. At WSS#1 in the optical network 2-3, the wavelengths λ1-λ3 are unused, while λ4 is used to carry out switching for optical connection.

In the third modification, at WSS#1, the inclination angle controllers 32a-1 through 32a-3 corresponding to the wavelengths λ1-λ3 are powered OFF, while the inclination angle controller 32a-4 corresponding to λ4 is powered ON. The driving voltage amplifiers 32b-1 through 32b-3 corresponding to λ1-λ3 are powered OFF, while the driving voltage amplifier 32b-4 corresponding to the wavelength λ4 is powered ON.

At each of WSS#2 and WSS#3, in the third modification, the inclination angle controllers 32a-1 through 32a-3 corresponding to the wavelengths λ1-λ3 are powered OFF, while the inclination angle controller 32a-4 corresponding to λ4 is powered ON. The driving voltage amplifiers 32b-1 through 32b-4 corresponding to λ1-λ4 are all powered OFF.

At WSS#4, WSS#5 and WSS#6, the wavelengths λ1-λ3 are unused, while λ4 is used to carry out switching for optical connection. In this state, the inclination angle controllers 32a-1 through 32a-3 corresponding to the wavelengths λ1-λ3 are powered OFF, while the inclination angle controller 32a-4 corresponding to λ4 is powered ON. The driving voltage amplifiers 32b-1 through 32b-3 corresponding to λ1-λ3 are powered OFF, while the driving voltage amplifier 32b-4 corresponding to the wavelength λ4 is powered ON.

Figure 20:
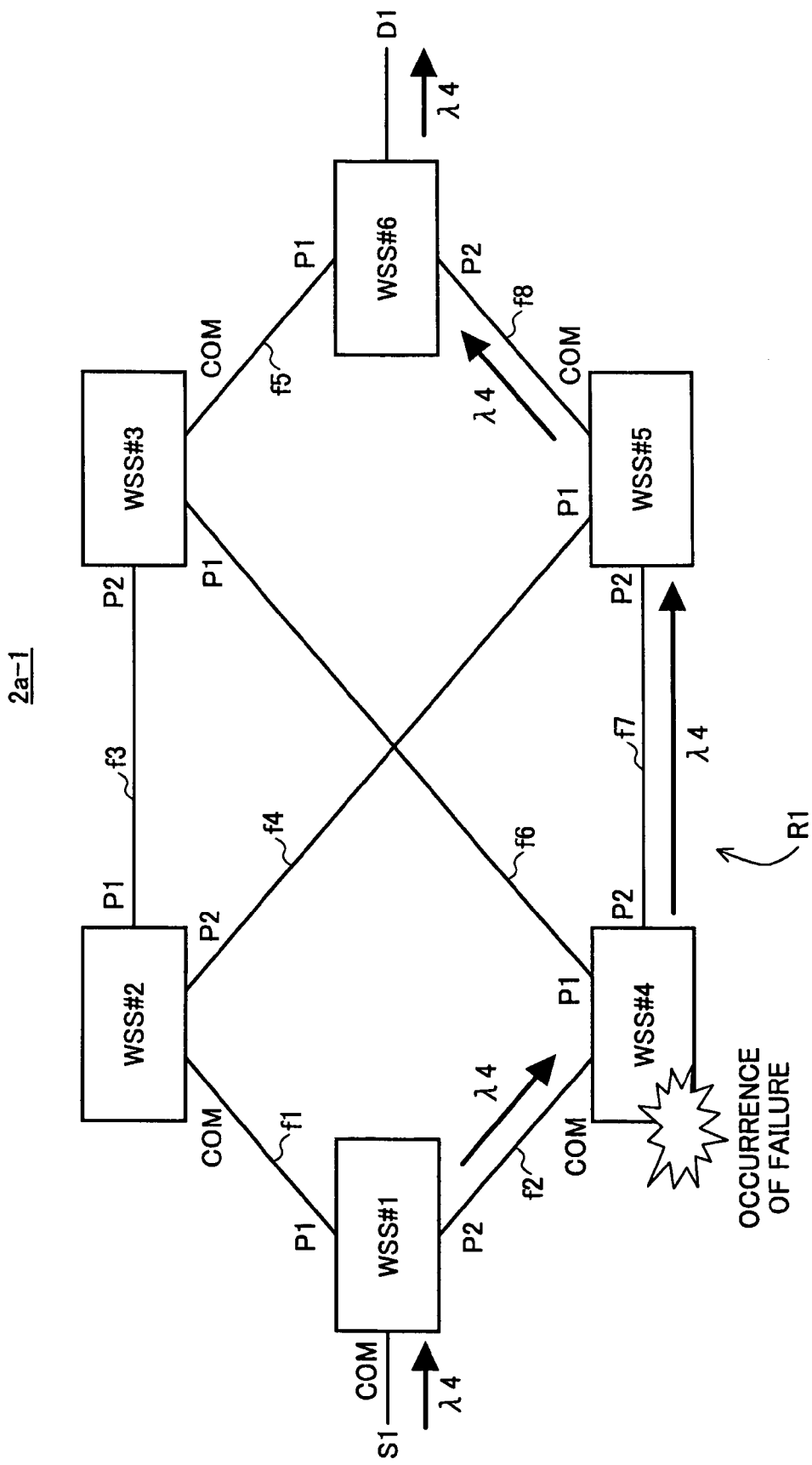
FIG. 20 illustrates an optical network in which a failure has occurred.

Next, explanation is made of an application of the third modification. FIG. 20 illustrates an optical network 2a-1 in which failure has occurred. The optical network 2a-1 has the same structure as the optical network 2 illustrated in FIG. 11. In the optical network 2a-1, power saving control is performed and a route R1 is established. In this state, a failure has occurred at WSS#4, and accordingly, another route is to be established.

Figure 21:
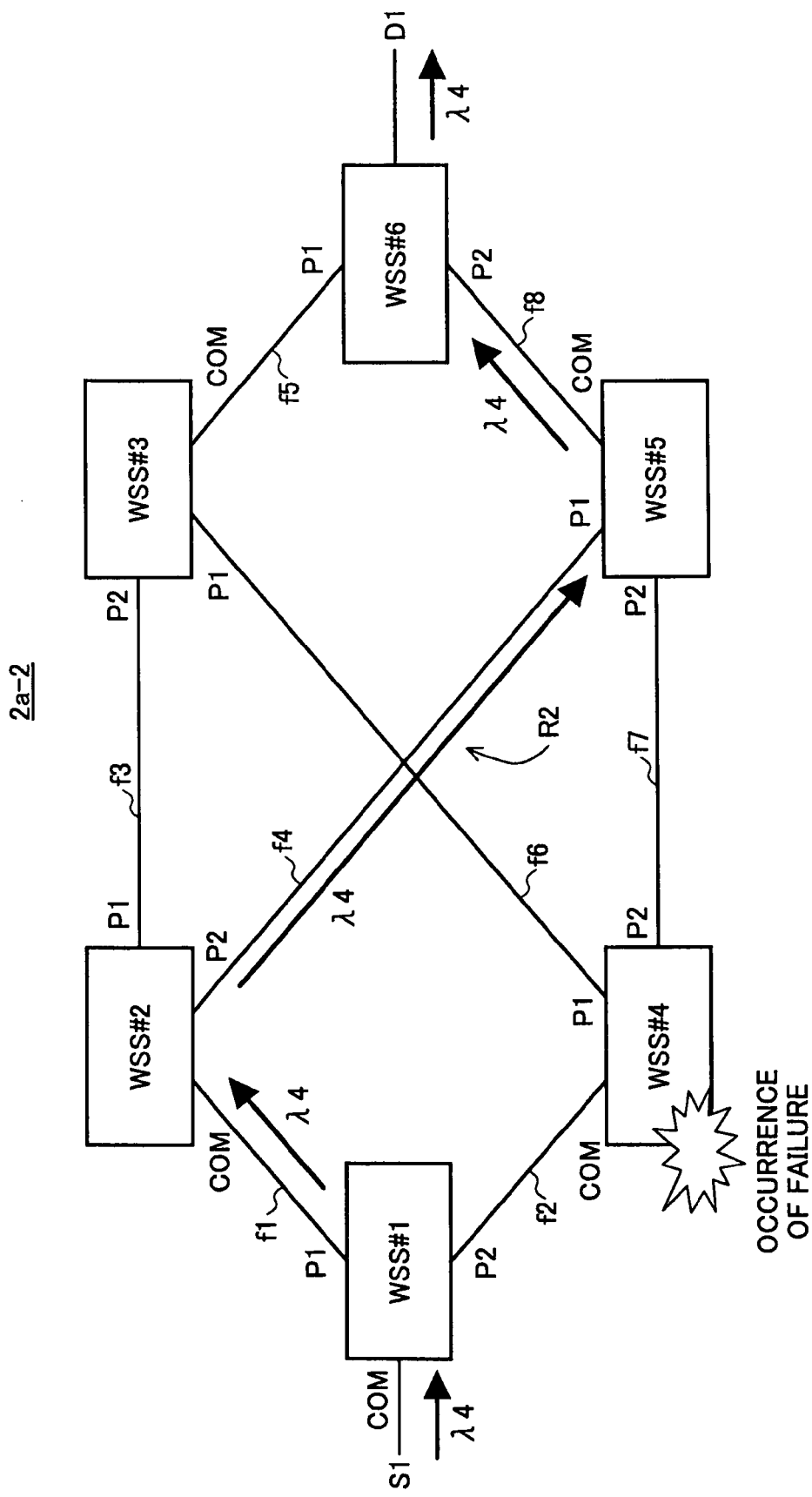
FIG. 21 illustrates an optical network in which a route has been switched.

FIG. 21 illustrates an optical network 2a-2 in which a route has been switched from R1 to R2. Under the situation where a failure has occurred at WSS#4 on the route R1, an alternative route from S1 to D1 that minimizes the total power consumption is S1→WSS#1→WSS#2→WSS#5→WSS#6→D1, which route is denoted by R2. Since the inclination angle controller 32a-4 corresponding to the wavelength λ4 is maintained in the WAKE state at WSS#2, the path can be switched quickly, and the new route R2 can be established fast.

In this manner, in the third modification, at a WSS through which traffic does not pass, the inclination angle controller corresponding to a wavelength being used in the optical network is maintained in the WAKE state, while the inclination angle controllers corresponding to the wavelength(s) currently unused in the optical network are brought into the SLEEP state. This arrangement can save power in the optical network. In addition, even if a failure has occurred on the established route, fast path switching for establishing an alternative route can be realized.

Next, explanation is made of the fourth modification. In the fourth modification, a power consumption cost value Cp per WSS is determined based upon a combination (Pi, λm) of the currently allocated port number Pi and wavelength λm. Another power consumption cost value Cq per WSS is determined based upon a combination (Pj, λn) of a currently unused port number Pj and wavelength λn. The power consumption cost value Cp per WSS and the power consumption cost value Cq per WSS are compared to each other. If Cp>Cq, the allocation is automatically changed from (Pi, λm) to (Pj, λn).

Figure 22:
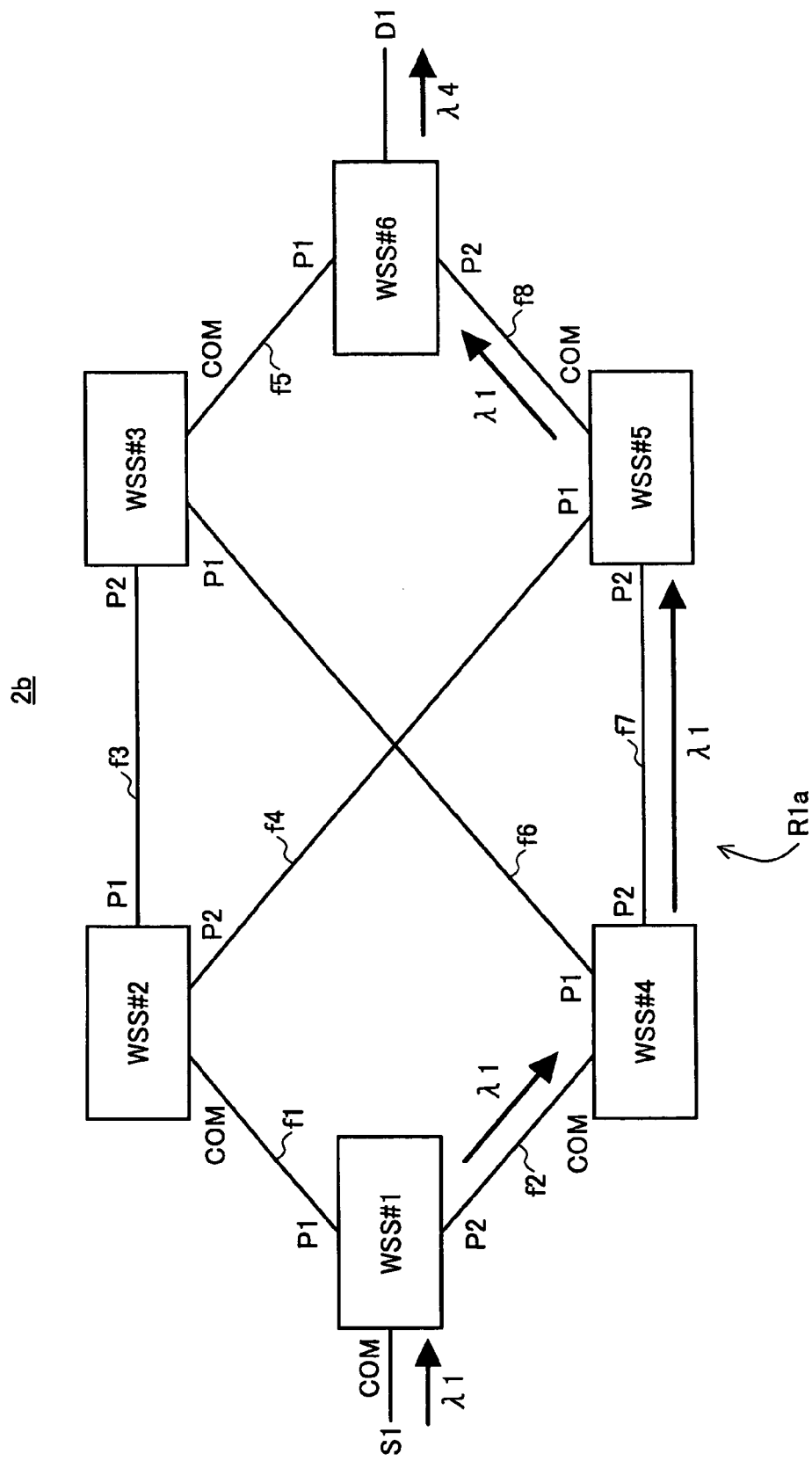
FIG. 22 illustrates a structural example of an optical network.

FIG. 22 illustrates a structural example of an optical network 2b. In the optical network 2b, a route R1a is established through S1→WSS#1→WSS#4→WSS#5→WSS#6→D1 optically connected using wavelength λ1.

The combination of port number and wavelength for route R1a is (P2, λ1). The power consumption cost value per WSS is Cp=36 from the power cost value table T1 of FIG. 12.

According to the power cost value table T1 illustrated in FIG. 12, there is a combination (P2, λ4) of unused port number P2 and wavelength λ4. The power consumption cost value Cq per WSS for the unused combination is 30 (Cq=30). Because Cp>Cq is satisfied, the combination of port number and wavelength is automatically changed from (P2, λ1) to (P2, λ4). The new route based upon the changed combination is R1 illustrated in FIG. 11.

In the fourth modification, allocation of the port number and the wavelength is carried out so as to maintain the optimum state by automatically selecting the best combination. Accordingly, power saving control of the optical network can be automatically carried out even if the topology of the optical network changes.

As has been described above, by managing power consumption per WSS as a cost value determined depending on a connection port and a wavelength in an optical network, power saving control is efficiently carried out in the optical network.

The total power cost value of the optical network 2 illustrated in FIG. 11 is 520, the total power cost value of the optical network 2-1 of the first modification illustrated in FIG. 14 is 360, and the total power cost value of the optical network 2-2 of the second modification illustrated in FIG. 16 is 120.

In contrast, the total power cost value of the optical network 5 illustrated in FIG. 9 using a typical power saving control technique is 600. Assuming that the power cost value of 600 is 100%, the power saving control technique in the optical network 2 can reduce the power cost value to 87%. The first modification can reduce the power cost value to 60% of the conventional technique, and the second modification can further reduce the power const value to 20% of the conventional technique.

The embodiments have been explained using specific examples; however, the elements and the components may be replaced with other elements and components with similar functions and arbitrary elements or steps may be added.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority or inferiority of the invention. Although the embodiments of the present inventions have been described in detail, it should be understood that the various changes, substitutions, and alterations could be made hereto without departing from the spirit and scope of the invention.

What is claimed is:

1. An optical communication system comprising:
a plurality of wavelength selective switches arranged on an optical network; and
an optical network management apparatus configured to manage and control the optical network,
wherein in response to a path establishing request, the optical network management apparatus determines power consumption of each of paths that satisfies the path establishing request in the optical network based upon a wavelength being used at a connection port of each of the wavelength selective switches, selects a route based upon the determined power consumption of each of the paths, and sets the selected route in the optical network,
wherein each of the wavelength selective switches has a movable reflector having mirrors arranged corresponding to a plurality of wavelengths available in the optical network, the movable reflector being configured to change inclination angles of the mirrors to guide a light beam of the corresponding wavelength to one of first and second output ports of the wavelength selective switch, the first output port corresponding to a first inclination angle and the second output port corresponding to a second inclination angle smaller than the first inclination angle, and
wherein the optical network management apparatus controls the wavelength selective switches so as to connect adjacent wavelength selective switches using the second output port and allocates a longest wavelength among the available wavelengths for optical communication.

2. The optical communication system according to claim 1, wherein each of the wavelength selective switches has:
inclination angle controllers, each provided corresponding to one of the available wavelengths and configured to output a voltage signal for controlling the inclination angle of the associated mirror; and driving voltage amplifiers, each provided corresponding to one of the inclination angle controllers and configured to generate a driving voltage by amplifying the voltage signal and apply the driving voltage to the movable reflector, wherein the optical network management apparatus controls a first group of wavelength selective switches through which traffic passes so as to bring the inclination angle controllers corresponding to all the available wavelengths in a WAKE state, and bring the driving voltage amplifiers corresponding to unused wavelengths in a SLEEP state, while bringing the driving voltage amplifier corresponding to the wavelength currently used for the optical communication in the WAKE state, and the optical network management apparatus controls a second group of wavelength selective switches through which traffic does not pass so as to bring the inclination angle controllers corresponding to all the available wavelengths in the WAKE state and bring the driving voltage amplifiers corresponding to all the available wavelengths in the SLEEP state.

3. The optical communication system according to claim 1, wherein each of the wavelength selective switches has:

inclination angle controllers, each provided corresponding to one of the available wavelengths and configured to output a voltage signal for controlling the inclination angle of the associated mirror; and driving voltage amplifiers, each provided corresponding to one of the inclination angle controllers and configured to generate a driving voltage by amplifying the voltage signal and apply the driving voltage to the movable reflector, wherein the optical network management apparatus controls a first group of wavelength selective switches through which traffic passes so as to bring the inclination angle controllers corresponding to all the available wavelengths in a WAKE state, and bring the driving voltage amplifiers corresponding to unused wavelengths in a SLEEP state, while bringing the driving voltage amplifier corresponding to the wavelength currently used for the optical communication in the WAKE state, and the optical network management apparatus controls a second group of wavelength selective switches through which traffic does not pass so as to bring the inclination angle controllers and the driving voltage amplifiers corresponding to all the available wavelengths in the SLEEP state.

4. The optical communication system according to claim 1, wherein each of the wavelength selective switches has:

inclination angle controllers, each provided corresponding to one of the available wavelengths and configured to output a voltage signal for controlling the inclination angle of the associated mirror; and driving voltage amplifiers, each provided corresponding to one of the inclination angle controllers and configured to generate a driving voltage by amplifying the voltage signal and apply the driving voltage to the movable reflector, wherein the optical network management apparatus controls a first group of wavelength selective switches through which traffic passes so as to bring the inclination angle controllers and the driving voltage amplifiers corresponding to unused wavelengths in a SLEEP state, while bringing the inclination angle controller and the driving voltage amplifier corresponding to the wavelength currently used for the optical communication in a WAKE state, and the optical network management apparatus controls a second group of wavelength selective switches through which traffic does not pass so as to bring the inclination angle controllers and the driving voltage amplifiers corresponding to all the available wavelengths in the SLEEP state.

5. The optical communication system according to claim 1, wherein each of the wavelength selective switches has:

inclination angle controllers, each provided corresponding to one of the available wavelengths and configured to output a voltage signal for controlling the inclination angle of the associated mirror; and driving voltage amplifiers, each provided corresponding to one of the inclination angle controllers and configured to generate a driving voltage by amplifying the voltage signal and apply the driving voltage to the movable reflector, wherein the optical network management apparatus controls a first group of wavelength selective switches through which traffic passes so as to bring the inclination angle controllers and the driving voltage amplifiers corresponding to unused wavelengths in a SLEEP state, while bringing the inclination angle controller and the driving voltage amplifier corresponding to the wavelength currently used for the optical communication in a WAKE state, and the optical network management apparatus controls a second group of wavelength selective switches through which traffic does not pass so as to bring the inclination angle controllers and the driving voltage amplifiers corresponding to the unused wavelengths in the SLEEP state, while bringing the inclination angle controller corresponding to the wavelength currently used for the optical communication in the WAKE state.

6. The optical communication system according to claim 1, wherein the optical network management apparatus compares a first power consumption cost value determined from a first combination of a currently allocated port and a currently allocated wavelength with a second power consumption cost value determined from a second combination of an unused port and an unused wavelength, and wherein if the first power consumption cost value is greater than the second power consumption cost value, the optical network management apparatus changes from the first combination to the second combination to allocate the unused port and the unused wavelength of the second combination to the optical network.

7. An optical network management apparatus comprising:

a processor configured to manage and control an optical network in which a plurality of wavelength selective switches are arranged; and a communication interface configured to provide a communication interface with the wavelength selective switches, wherein in response to a path establishing request, the processor determines power consumption of each of paths that satisfies the path establishing request in the optical network based upon a wavelength being used at a connection port of each of the wavelength selective switches, selects a route based upon the determined power consumption of each of paths, and sets the selected route in the optical network, wherein each of the wavelength selective switches has a movable reflector having mirrors arranged corresponding to a plurality of wavelengths available in the optical network, the movable reflector being configured to change inclination angles of the mirrors to guide a light beam of the corresponding wavelength to one of first and second output ports of the wavelength selective switch, the first output port corresponding to a first inclination angle and the second output port corresponding to a second inclination angle smaller than the first inclination angle, and wherein the processor controls the wavelength selective switches so as to connect adjacent wavelength selective switches using the second output port and allocates a longest wavelength among the available wavelengths for optical communication.

8. The optical network management apparatus according to claim 7, wherein each of the wavelength selective switches has:

inclination angle controllers, each provided corresponding to one of the available wavelengths and configured to output a voltage signal for controlling the inclination angle of the associated mirror; and driving voltage amplifiers, each provided corresponding to one of the inclination angle controllers and configured to generate a driving voltage by amplifying the voltage signal and apply the driving voltage to the movable reflector, wherein the processor controls a first group of wavelength selective switches through which traffic passes so as to bring the inclination angle controllers corresponding to all the available wavelengths in a WAKE state, and bring the driving voltage amplifiers corresponding to unused wavelengths in a SLEEP state, while bringing the driving voltage amplifier corresponding to the wavelength currently used for the optical communication in the WAKE state, and the processor controls a second group of wavelength selective switches through which traffic does not pass so as to bring the inclination angle controllers corresponding to all the available wavelengths in the WAKE state and bring the driving voltage amplifiers corresponding to all the available wavelengths in the SLEEP state.

9. The optical network management apparatus according to claim 7, wherein each of the wavelength selective switches has:

inclination angle controllers, each provided corresponding to one of the available wavelengths and configured to output a voltage signal for controlling the inclination angle of the associated mirror; and driving voltage amplifiers, each provided corresponding to one of the inclination angle controllers and configured to generate a driving voltage by amplifying the voltage signal and apply the driving voltage to the movable reflector, wherein the processor controls a first group of wavelength selective switches through which traffic passes so as to bring the inclination angle controllers corresponding to all the available wavelengths in a WAKE state, and bring the driving voltage amplifiers corresponding to unused wavelengths in a SLEEP state, while bringing the driving voltage amplifier corresponding to the wavelength currently used for the optical communication in the WAKE state, and the processor controls a second group of wavelength selective switches through which traffic does not pass so as to bring the inclination angle controllers and the driving voltage amplifiers corresponding to all the available wavelengths in the SLEEP state.

10. The optical network management apparatus according to claim 7, wherein each of the wavelength selective switches has:

inclination angle controllers, each provided corresponding to one of the available wavelengths and configured to output a voltage signal for controlling the inclination angle of the associated mirror; and driving voltage amplifiers, each provided corresponding to one of the inclination angle controllers and configured to generate a driving voltage by amplifying the voltage signal and apply the driving voltage to the movable reflector, wherein the processor controls a first group of wavelength selective switches through which traffic passes so as to bring the inclination angle controllers and the driving voltage amplifiers corresponding to unused wavelengths in a SLEEP state, while bringing the inclination angle controller and the driving voltage amplifier corresponding to the wavelength currently used for the optical communication in a WAKE state, and the processor controls a second group of wavelength selective switches through which traffic does not pass so as to bring the inclination angle controllers and the driving voltage amplifiers corresponding to all the available wavelengths in the SLEEP state.

11. The optical network management apparatus according to claim 7, wherein each of the wavelength selective switches has:

inclination angle controllers, each provided corresponding to one of the available wavelengths and configured to output a voltage signal for controlling the inclination angle of the associated mirror; and driving voltage amplifiers, each provided corresponding to one of the inclination angle controllers and configured to generate a driving voltage by amplifying the voltage signal and apply the driving voltage to the movable reflector, wherein the processor controls a first group of wavelength selective switches through which traffic passes so as to bring the inclination angle controllers and the driving voltage amplifiers corresponding to unused wavelengths in a SLEEP state, while bringing the inclination angle controller and the driving voltage amplifier corresponding to the wavelength currently used for the optical communication in a WAKE state, and the processor controls a second group of wavelength selective switches through which traffic does not pass so as to bring the inclination angle controllers and the driving voltage amplifiers corresponding to the unused wavelengths in the SLEEP state, while bringing the inclination angle controller corresponding to the wavelength currently used for the optical communication in the WAKE state.

12. The optical network management apparatus according to claim 7, wherein the processor compares a first power consumption cost value determined from a first combination of a currently allocated port and a currently allocated wavelength with a second power consumption cost value determined from a second combination of an unused port and an unused wavelength, and wherein if the first power consumption cost value is greater than the second power consumption cost value, the optical network management apparatus changes from the first combination to the second combination to allocate the unused port and the unused wavelength of the second combination to the optical network.

13. An optical network management method comprising:

in response to a path establishing request, determining power consumption of each of paths that satisfies the path establishing request in an optical network, based upon a wavelength being used at a connection port of a plurality of wavelength selective switches arranged on the optical network, selecting a route based upon the determined power consumption of each of the paths, and setting the selected route in the optical network, wherein each of the wavelength selective switches has a movable reflector having mirrors arranged corresponding to a plurality of wavelengths available in the optical network, the movable reflector being configured to change inclination angles of the mirrors to guide a light beam of the corresponding wavelength to one of first and second output ports of the wavelength selective switch, the first output port corresponding to a first inclination angle and the second output port corresponding to a second inclination angle smaller than the first inclination angle, and the method further comprising:

controlling the wavelength selective switches so as to connect adjacent wavelength selective switches using the second output port; and allocating a longest wavelength among the available wavelengths for optical communication.

14. The optical network management method according to claim 13, wherein each of the wavelength selective switches has:

inclination angle controllers, each provided corresponding to one of the available wavelengths and configured to output a voltage signal for controlling the inclination angle of the associated mirror; and driving voltage amplifiers, each provided corresponding to one of the inclination angle controllers and configured to generate a driving voltage by amplifying the voltage signal and apply the driving voltage to the movable reflector, the method further comprising;

controlling for a first group of wavelength selective switches through which traffic passes so as to bring the inclination angle controllers corresponding to all the available wavelengths in a WAKE state, and bring the driving voltage amplifiers corresponding to unused wavelengths in a SLEEP state, while bringing the driving voltage amplifier corresponding to the wavelength currently used for the optical communication in the WAKE state, and controlling for a second group of wavelength selective switches through which traffic does not pass so as to bring the inclination angle controllers corresponding to all the available wavelengths in the WAKE state and bring the driving voltage amplifiers corresponding to all the available wavelengths in the SLEEP state.

15. The optical network management method according to claim 13, wherein each of the wavelength selective switches has:

inclination angle controllers, each provided corresponding to one of the available wavelengths and configured to output a voltage signal for controlling the inclination angle of the associated mirror; and driving voltage amplifiers, each provided corresponding to one of the inclination angle controllers and configured to generate a driving voltage by amplifying the voltage signal and apply the driving voltage to the movable reflector, the method further comprising:

controlling for a first group of wavelength selective switches through which traffic passes so as to bring the inclination angle controllers corresponding to all the available wavelengths in a WAKE state, and bring the driving voltage amplifiers corresponding to unused wavelengths in a SLEEP state, while bringing the driving voltage amplifier corresponding to the wavelength currently used for the optical communication in the WAKE state, and controlling for a second group of wavelength selective switches through which traffic does not pass so as to bring the inclination angle controllers and the driving voltage amplifiers corresponding to all the available wavelengths in the SLEEP state.

16. The optical network management method according to claim 13, wherein each of the wavelength selective switches has:

inclination angle controllers, each provided corresponding to one of the available wavelengths and configured to output a voltage signal for controlling the inclination angle of the associated mirror; and driving voltage amplifiers, each provided corresponding to one of the inclination angle controllers and configured to generate a driving voltage by amplifying the voltage signal and apply the driving voltage to the movable reflector, the method further comprising:

controlling for a first group of wavelength selective switches through which traffic passes so as to bring the inclination angle controllers and the driving voltage amplifiers corresponding to unused wavelengths in a SLEEP state, while bringing the inclination angle controller and the driving voltage amplifier corresponding to the wavelength currently used for the optical communication in a WAKE state, and controlling for a second group of wavelength selective switches through which traffic does not pass so as to bring the inclination angle controllers and the driving voltage amplifiers corresponding to all the available wavelengths in the SLEEP state.

17. The optical network management method according to claim 13, wherein each of the wavelength selective switches has:

inclination angle controllers, each provided corresponding to one of the available wavelengths and configured to output a voltage signal for controlling the inclination angle of the associated mirror; and driving voltage amplifiers, each provided corresponding to one of the inclination angle controllers and configured to generate a driving voltage by amplifying the voltage signal and apply the driving voltage to the movable reflector, the method further comprising:

controlling for a first group of wavelength selective switches through which traffic passes so as to bring the inclination angle controllers and the driving voltage amplifiers corresponding to unused wavelengths in a SLEEP state, while bringing the inclination angle controller and the driving voltage amplifier corresponding to the wavelength currently used for the optical communication in a WAKE state, and controlling for a second group of wavelength selective switches through which traffic does not pass so as to bring the inclination angle controllers and the driving voltage amplifiers corresponding to the unused wavelengths in the SLEEP state, while bringing the inclination angle controller corresponding to the wavelength currently used for the optical communication in the WAKE state.

* * * * *